(12) United States Patent
Watanabe

(10) Patent No.: US 11,704,065 B2
(45) Date of Patent: Jul. 18, 2023

(54) MEMORY SYSTEM LIMITING FETCHING FROM HOST SUBMISSION QUEUE BASED ON FREE SPACE OF CORRESPONDING COMPLETION QUEUE AND CONTROL METHOD THEREOF

(71) Applicant: Kioxia Corporation, Tokyo (JP)

(72) Inventor: Shuichi Watanabe, Fujisawa (JP)

(73) Assignee: Kioxia Corporation, Tokyo (JP)

( * ) Notice: Subject to any disclaimer, the term of this patent is extended or adjusted under 35 U.S.C. 154(b) by 70 days.

(21) Appl. No.: 17/332,259

(22) Filed: May 27, 2021

(65) Prior Publication Data

US 2022/0147276 A1 May 12, 2022

(30) Foreign Application Priority Data

Nov. 10, 2020 (JP) ................................ 2020-187076

(51) Int. Cl.
*G06F 3/06* (2006.01)

(52) U.S. Cl.
CPC .......... *G06F 3/0659* (2013.01); *G06F 3/0604* (2013.01); *G06F 3/0635* (2013.01); *G06F 3/0673* (2013.01); *G06F 3/061* (2013.01); *G06F 3/0679* (2013.01)

(58) Field of Classification Search
CPC .... G06F 3/0659; G06F 3/0604; G06F 3/0635; G06F 3/0673
See application file for complete search history.

(56) References Cited

U.S. PATENT DOCUMENTS

| | | | |
|---|---|---|---|
| 8,521,921 B1 * | 8/2013 | Mukherjee | G06F 13/28 710/33 |
| 10,235,102 B2 | 3/2019 | Richter et al. | |
| 10,740,243 B1 * | 8/2020 | Benisty | G06F 3/061 |
| 2002/0055993 A1 * | 5/2002 | Shah | H04L 47/10 709/200 |
| 2002/0091852 A1 * | 7/2002 | Frazier | H04L 47/266 709/210 |
| 2016/0117119 A1 * | 4/2016 | Kim | G06F 13/1642 711/103 |
| 2017/0322897 A1 | 11/2017 | Benisty et al. | |
| 2018/0157445 A1 | 6/2018 | Gissin et al. | |
| 2018/0203605 A1 | 7/2018 | Tseng | |
| 2018/0285073 A1 * | 10/2018 | Fukuchi | G06F 3/0679 |
| 2018/0314450 A1 | 11/2018 | Qiu et al. | |

(Continued)

FOREIGN PATENT DOCUMENTS

| | | |
|---|---|---|
| CN | 107003943 A | 8/2017 |
| CN | 110413542 A | 11/2019 |

(Continued)

*Primary Examiner* — Charles Rones
*Assistant Examiner* — Hewy H Li
(74) *Attorney, Agent, or Firm* — Oblon, McClelland, Maier & Neustadt, L.L.P.

(57) ABSTRACT

According to one embodiment, a controller of a memory system executes communication with a host in conformity with a standard of NVM express. When fetching a command from a first submission queue, the controlled of the memory system determine the number of commands to be fetched with the number of free slots among a plurality of slots included in a first completion queue as an upper limit. The controller fetches the determined number of commands from the first submission queue.

20 Claims, 22 Drawing Sheets

(56) References Cited

U.S. PATENT DOCUMENTS

| | | | |
|---|---|---|---|
| 2018/0341410 A1* | 11/2018 | Benisty | .................. G06F 3/061 |
| 2018/0349026 A1* | 12/2018 | Richter | ................. G06F 3/0688 |
| 2020/0174673 A1 | 6/2020 | Ikeda et al. | |
| 2020/0225879 A1 | 7/2020 | Helmick et al. | |

FOREIGN PATENT DOCUMENTS

| | | |
|---|---|---|
| JP | 2020-91554 A | 6/2020 |
| TW | 201828035 A | 8/2018 |

* cited by examiner

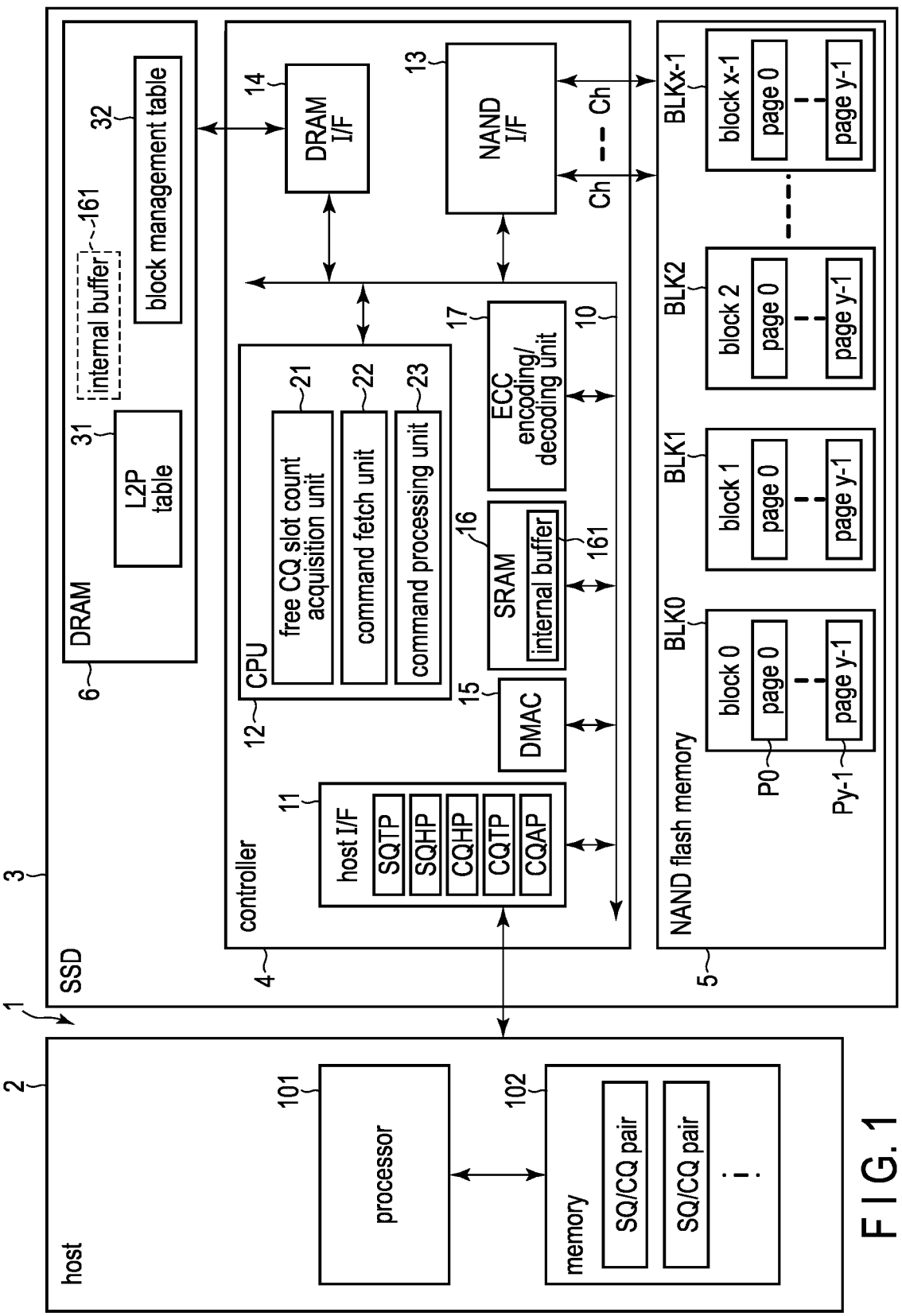
F I G. 1

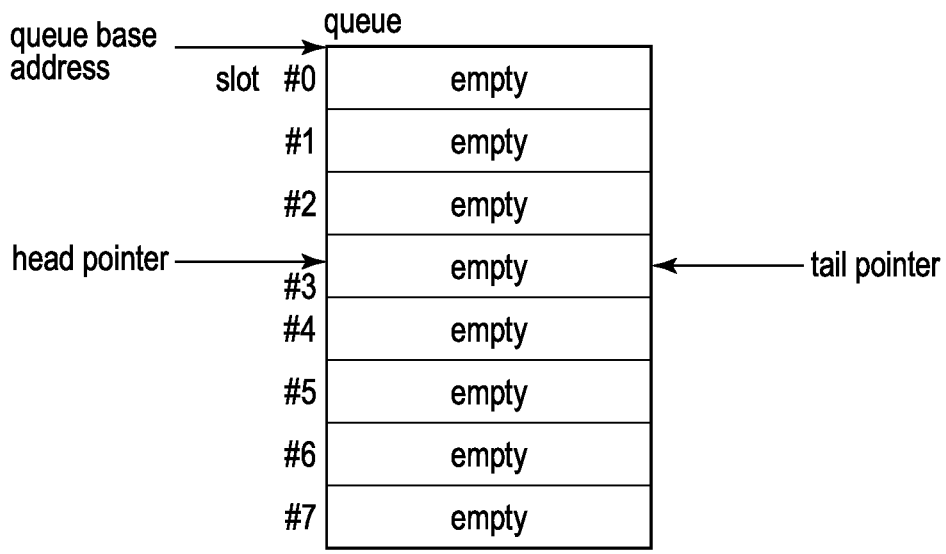
F I G. 2
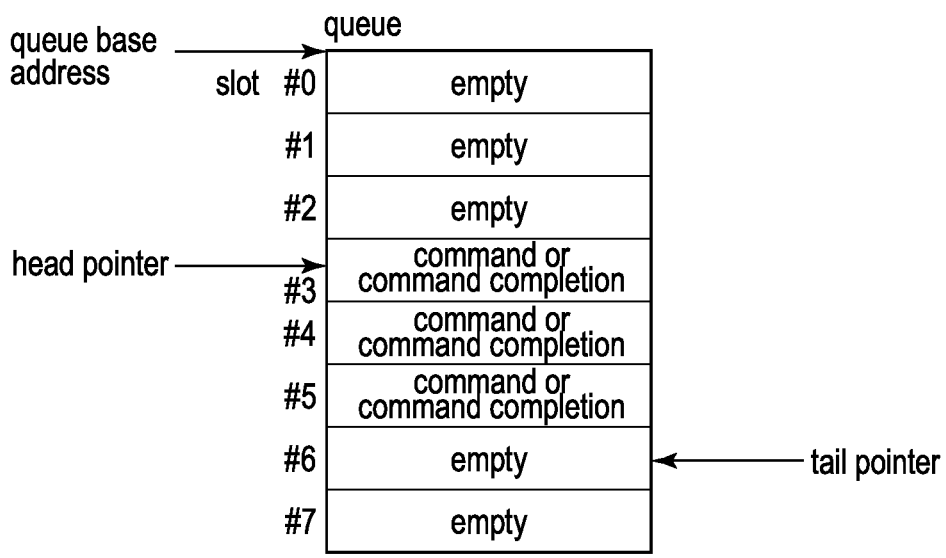
F I G. 3

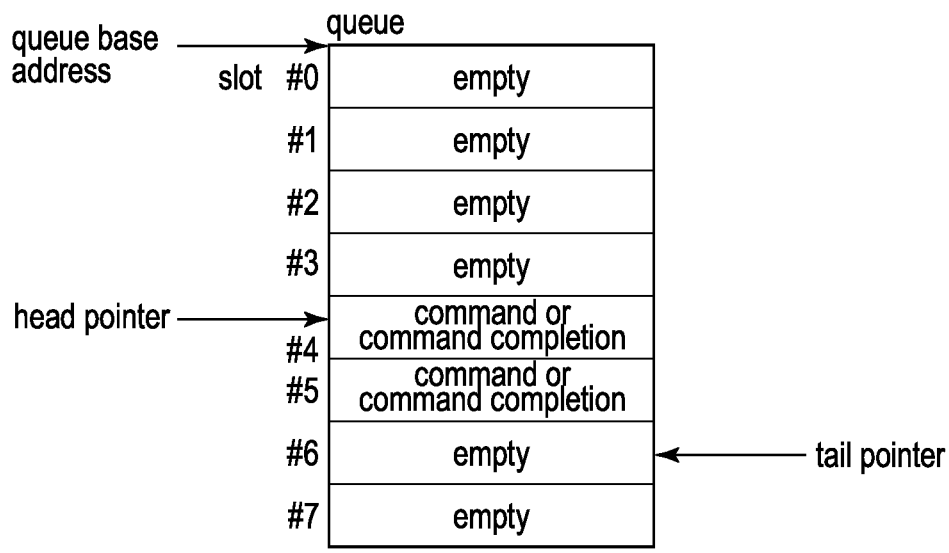
F I G. 4
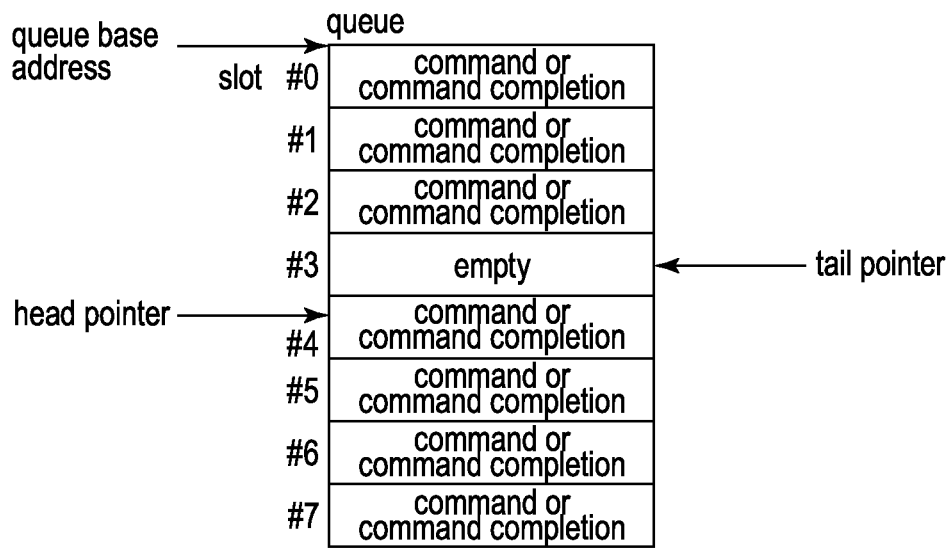
F I G. 5

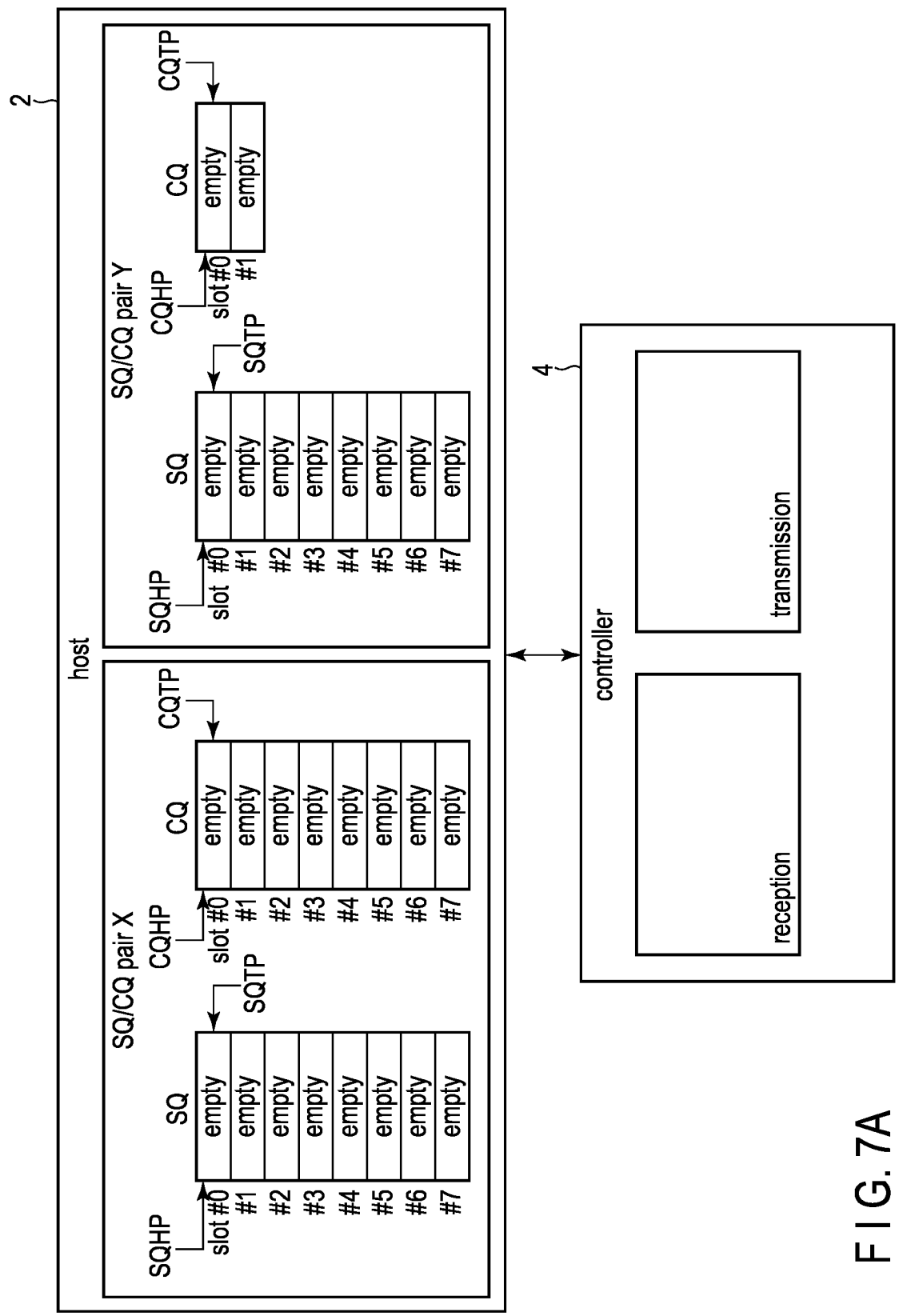
F I G. 7A

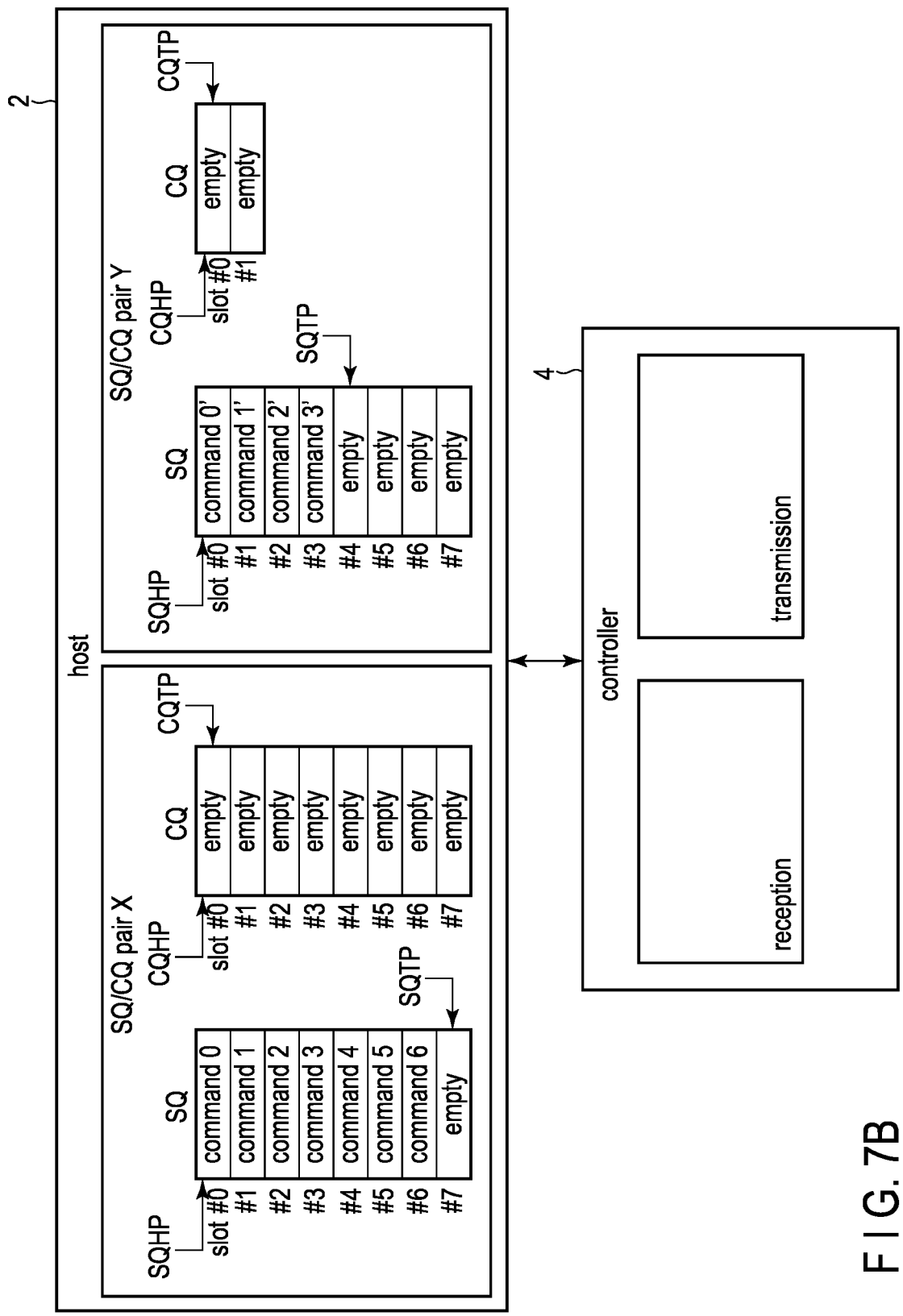
F I G. 7B

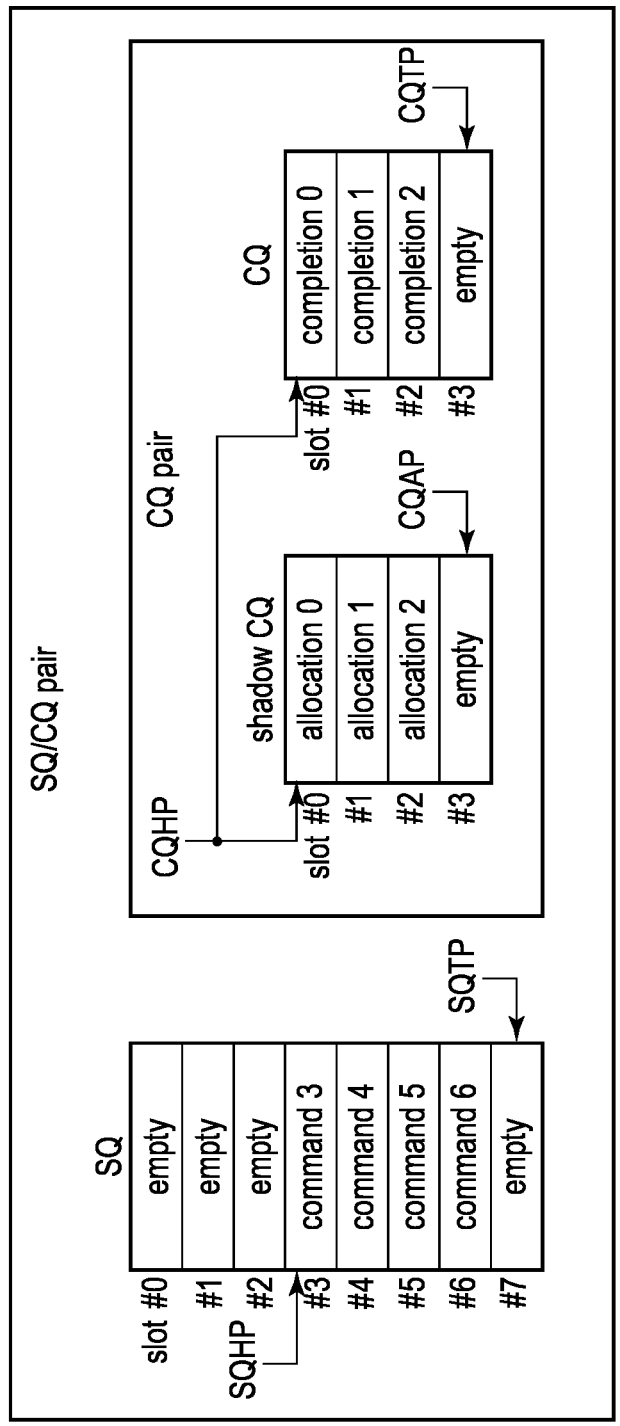
F I G. 9D

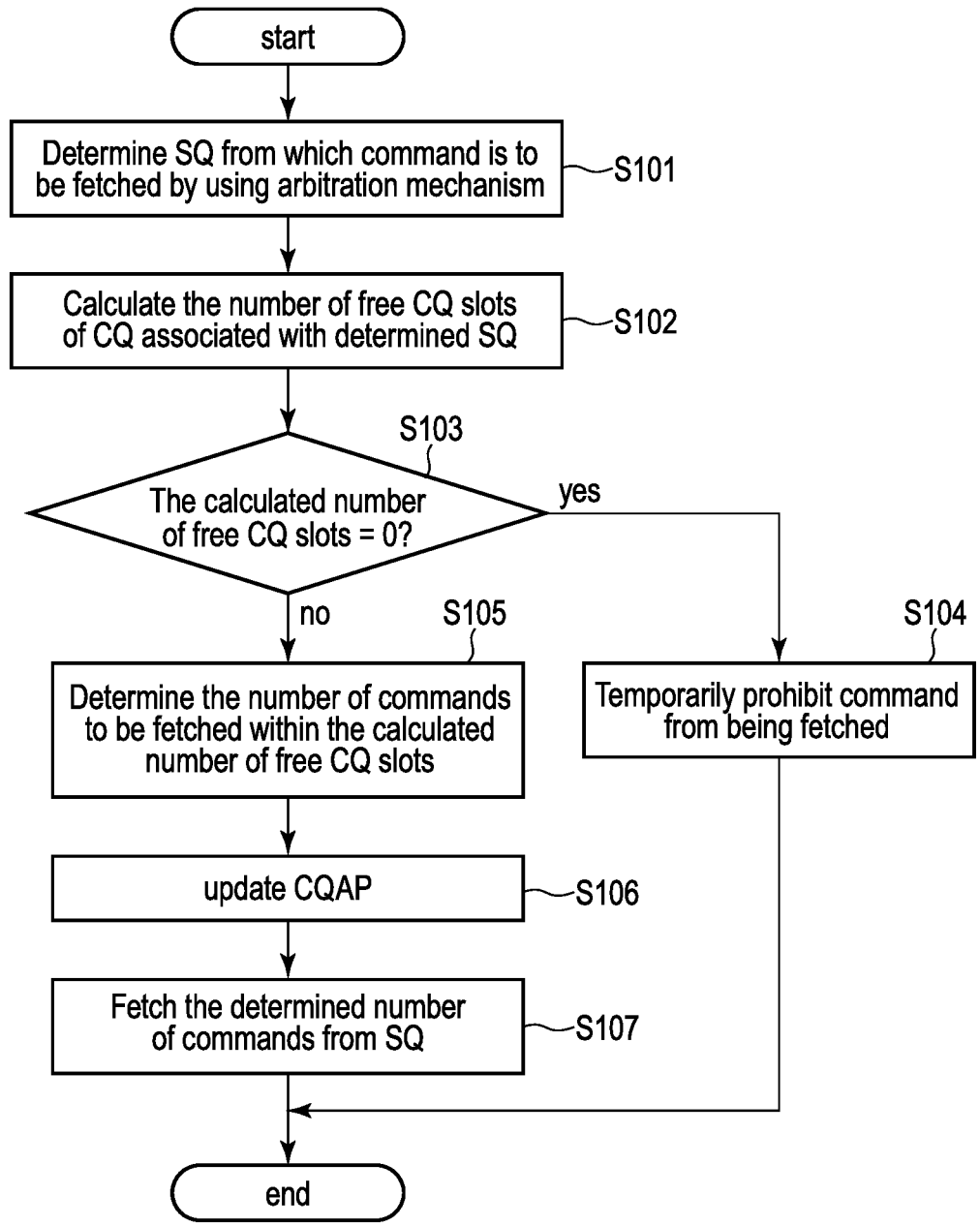
F I G. 11

MEMORY SYSTEM LIMITING FETCHING FROM HOST SUBMISSION QUEUE BASED ON FREE SPACE OF CORRESPONDING COMPLETION QUEUE AND CONTROL METHOD THEREOF

CROSS-REFERENCE TO RELATED APPLICATIONS

This application is based upon and claims the benefit of priority from Japanese Patent Application No. 2020-187076, filed Nov. 10, 2020, the entire contents of which are incorporated herein by reference.

FIELD

Embodiments described herein relate generally to a technology of controlling a nonvolatile memory.

BACKGROUND

Memory systems implemented with a nonvolatile memory have recently become widespread. As such memory systems, a solid state drive (SSD) implemented with a NAND flash memory has been known.

NVM Express™ (NVMe™) is known as a standard for a logical interface for communication between a host and a memory system such as the SSD. In a protocol of the NVMe standard, a host places each command into any submission queue in the host. In the protocol of the NVMe standard, a controller included in the memory system places a status of a completed command into a completion queue in the host, as a command completion.

In such a memory system, when the completion queue become full due to delay in the host's processes for command completions in the completion queue, a next command completion cannot be placed into the completion queue. As a result, several command completions that are to be placed into the completion queue may stay in the controller. Such stay of the command completions may cause the controller to stop processes of commands.

Thus, in the memory system, it is required to implement a new function capable of smoothly executing processes of commands from the host.

BRIEF DESCRIPTION OF THE DRAWINGS

FIG. 1 is a block diagram illustrating a configuration example of an information processing system including a memory system according to an embodiment.

FIG. 2 is a diagram illustrating a relationship between a head pointer and a tail pointer in a case where a queue assigned in a memory of a host, to which the memory system according to the embodiment is connected, is empty.

FIG. 3 is a diagram illustrating an operation of updating the tail pointer in a case where new queue entries are placed into slots of the queue.

FIG. 4 is a diagram illustrating an operation of updating the head pointer in a case where a command or a command completion placed into a slot the queue is consumed.

FIG. 5 is a diagram illustrating a relationship between the head pointer and the tail pointer in a case where the queue is full.

FIG. 7A is a diagram illustrating a first process of the command process according to the comparative example.

FIG. 7B is a diagram illustrating a second process of the command process according to the comparative example.

FIG. 9D is a diagram illustrating a fourth process of the command process executed in the memory system according to the embodiment.

FIG. 11 is a flowchart illustrating a procedure of a command process executed in the memory system according to the embodiment.

DETAILED DESCRIPTION

Figure 6:
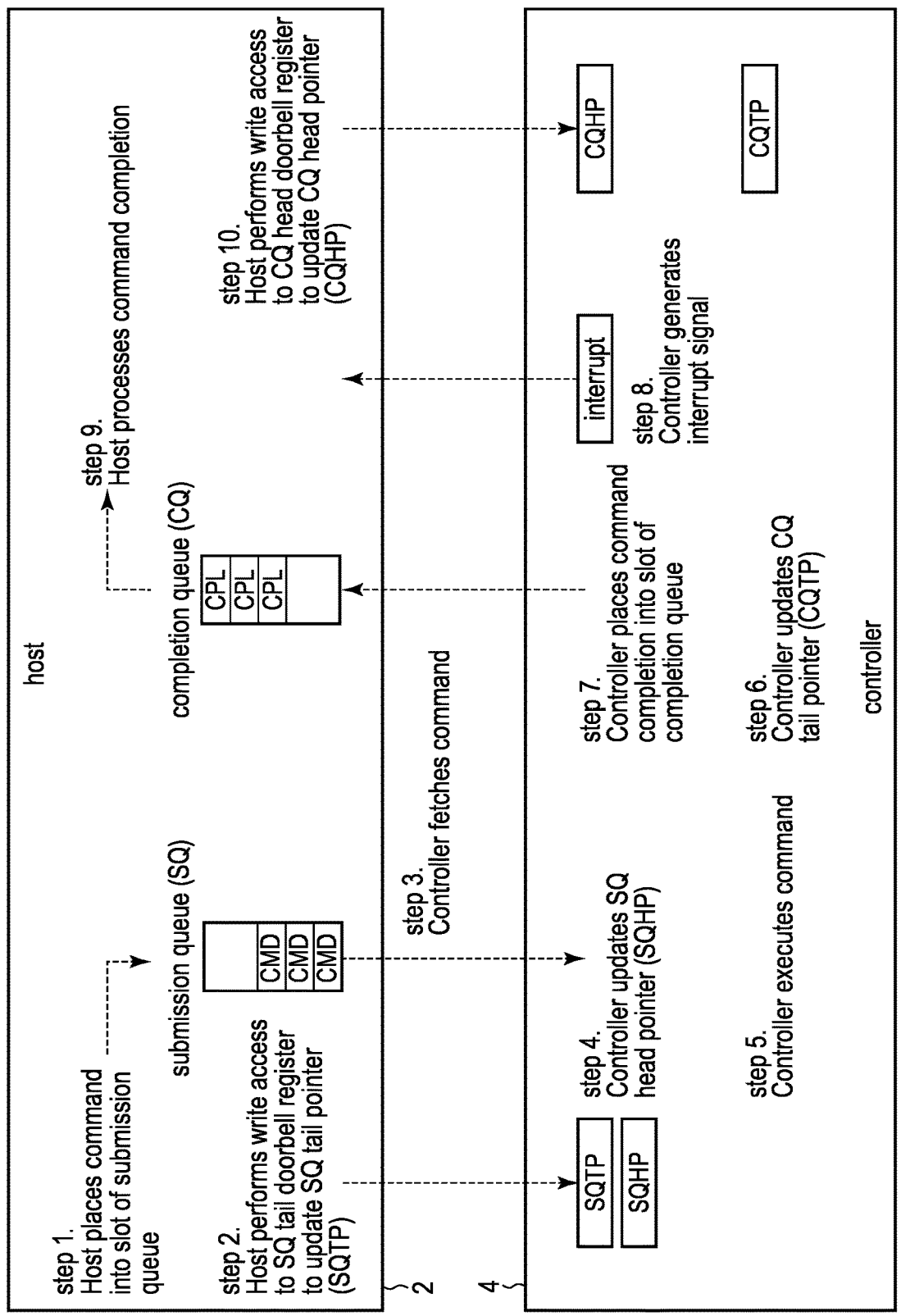
FIG. 6 is a diagram illustrating a procedure of a command process according to a comparative example.

Various embodiments will be described hereinafter with reference to the accompanying drawings.

In general, according to one embodiment, a memory system comprises a nonvolatile memory, and a controller electrically connected to the nonvolatile memory. The controller is configured to control the nonvolatile memory and execute communication with a host in conformity with a standard of NVM express.

When fetching a command from a first submission queue, the controller determines the number of commands to be fetched with the number of free slots among a plurality of slots included in a first completion queue as an upper limit. The first completion queue is associated with the first submission queue. The controller fetches the determined number of commands from the first submission queue.

FIG. 1 is a block diagram illustrating a configuration example of an information processing system 1 including a memory system according to an embodiment. The information processing system 1 includes a host (host device) 2 and the memory system 3.

The memory system 3 is a semiconductor storage device configured to write data to a nonvolatile memory and read data from the nonvolatile memory. The memory system 3 may be implemented as, for example, a solid state drive (SSD) 3 that includes a NAND flash memory.

The SSD 3 may be connected to the host 2 via a cable or a network. Alternatively, the SSD 3 may be built in the host 2. As a standard of a logical interface to connect the host 2 and the SSD 3, the NVMe standard may be used. In a protocol of the NVMe standard, communication between the host 2 and the SSD 3 is executed by using a pair of queues, which includes at least one submission queue (SQ) and a completion queue (CQ) associated with the at least one submission queue (SQ). This pair of queues is referred to as a submission/completion queue pair (SQ/CQ pair).

The host 2 is an information processing apparatus configured to control the SSD 3. Examples of the host 2 include a personal computer, a server computer, a mobile terminal, or a vehicle-mounted device.

The host 2 includes a processor 101 and a memory 102. The memory 102 is a main memory provided in the host 2. The memory 102 is implemented as, for example, a random access memory such as a dynamic random access memory (DRAM). A part of a memory region of the memory 102 is used to store one or more of SQ/CQ pairs. FIG. 1 illustrates a case where a plurality of SQ/CQ pairs are stored in a part of the memory region of the memory 102.

A certain SQ/CQ pair may include only one submission queue (SQ) and one completion queue (CQ). In this case, the submission queue (SQ) and the completion queue (CQ) are associated with each other in a 1:1 mapping. Another SQ/CQ pair may include n (n≥2) submission queues (SQ) and one completion queue (CQ). In this case, these submission queues (SQ) are associated with the same completion queue (CQ) in an n:1 mapping. That is, each of the SQ/CQ pairs includes one completion queue (CQ) and at least one submission queue (SQ).

In the protocol of the NVMe standard, issuing each command from the host 2 to the SSD 3 and notification of each command completion from the SSD 3 to the host 2 are executed by using at least one SQ/CQ pair.

In this case, each command is placed by the host 2 into any submission queue (SQ) of one or more submission queues (SQ) in the host 2. A command completion indicative of a status of a command whose process is completed is placed by a controller 4 of the SSD 3 into the completion queue (CQ) associated with the submission queue (SQ) used to issue this command. The command completion may also be referred to as "command completion response", "completion", or "command completion status".

The SSD 3 is configured to execute communication with the host 2 which includes at least one submission queue (SQ) and a completion queue (CQ) associated with the at least one submission queue (SQ), in conformity with the NVMe standard.

The interface to implement the NVMe standard includes an interface through PCI Express™ (PCIe™) bus (i.e., NVMe over PCIe), and an interface through a network such as the Ethernet™ (i.e., NVMe over Fabrics: NVMe-OF). The interface standard to which the SSD 3 conforms may be the NVMe over PCIe or may be the NVMe-OF.

The SSD 3 includes the controller 4 and a nonvolatile memory, for example, NAND flash memory 5. The SSD 3 may also include a random access memory, for example, a DRAM 6.

The NAND flash memory 5 includes a memory cell array including a plurality of memory cells arranged in matrix. The NAND flash memory 5 may be a flash memory having a two-dimensional structure or a flash memory having a three-dimensional structure.

The memory cell array of the NAND flash memory 5 includes a plurality of blocks BLK0 to BLKx−1. Each of the plurality of blocks BLK0 to BLKx−1 includes a plurality of pages (here, pages P0 to Py−1). Each of the plurality of pages P0 to Py−1 includes a plurality of memory cells connected to the same word line. Each of the plurality of blocks BLK0 to BLKx−1 is a unit for a data erase operation of erasing data. Each of the plurality of pages P0 to Py−1 is a unit for a data write operation of writing data and a data read operation of reading data.

The controller 4 controls a data write operation of writing data received from the host 2 to the NAND flash memory 5 and a data read operation of reading data to be sent to the host 2 from the NAND flash memory 5, by controlling the NAND flash memory 5. The controller 4 operates as a memory controller configured to control the NAND flash memory 5.

The controller 4 may be a circuit such as a system-on-a-chip (SoC). The controller 4 is electrically connected to the NAND flash memory 5 via a NAND interface 13 that conforms to standards such as Toggle NAND flash interface or Open NAND Flash Interface (ONFI). However, the standard to which the NAND interface 13 conforms is not limited to these examples.

The controller 4 includes a host interface 11, a central processing unit (CPU) 12, a DRAM interface 14, a direct memory access controller (DMAC) 15, a static RAM (SRAM) 16, and an ECC encoding/decoding unit 17, in addition to the NAND interface 13. The host interface 11, the CPU 12, the NAND interface 13, the DRAM interface 14, the DMAC 15, the SRAM 16, and the ECC encoding/decoding unit 17 are interconnected via a bus 10.

The host interface 11 is a host interface circuit configured to execute communication with the host 2. The host interface 11 is, for example, a PCIe controller. Alternatively, when the SSD 3 is configured to incorporate a network interface controller, the host interface 11 may be implemented as a part of the network interface controller.

The host interface 11 executes communication with the host 2 in conformity with the NVMe standard. The host interface 11 includes an arbitration mechanism. The arbitration mechanism is a mechanism of selecting, from a plurality of submission queues that exist on the memory 102 of the host 2, a submission queue from which a command is to be fetched. The arbitration mechanism may be a round robin arbitration mechanism or may be a weighted round robin arbitration mechanism. Then, the host interface 11 fetches one or more commands from the submission queue selected by the arbitration mechanism, under the control of the CPU 12.

The host interface 11 manages a submission queue tail pointer (SQTP) and a submission queue head pointer (SQHP) for each submission queue (SQ). Furthermore, the host interface 11 manages a completion queue tail pointer (CQTP) and a completion queue head pointer (CQHP) for each completion queue (CQ).

Each of the submission queues (SQ) and the completion queues (CQ) may be implemented as a ring buffer. Each of the submission queues (SQ) and the completion queues (CQ) includes a plurality of slots. Each of the plurality of slots is used to store one queue entry (one command or one command completion).

A condition of the submission queue (SQ) is managed by using the submission queue tail pointer (SQTP) corresponding to this submission queue (SQ) and the submission queue head pointer (SQHP) corresponding to this submission queue (SQ). Similarly, a condition of the completion queue (CQ) is managed by using the completion queue tail pointer (CQTP) corresponding to this completion queue (CQ) and the completion queue head pointer (CQHP) corresponding to this completion queue (CQ).

The submission queue tail pointer (SQTP) is a pointer updated by the host 2 when the host 2 places a command into the submission queue (SQ). The submission queue tail pointer (SQTP) is indicative of a next free slot in the submission queue (SQ). The free slot indicated by the submission queue tail pointer (SQTP) means a slot available for storing a new submission queue entry, that is, a new command. The next free slot in the submission queue (SQ) is also referred to as a next free SQ slot. The host 2 places a new command into the next free SQ slot indicated by the submission queue tail pointer (SQTP).

The submission queue tail pointer (SQTP) is stored in a submission queue tail doorbell resister in the host interface 11. When the host 2 places one or more new commands into a certain submission queue (SQ), the host 2 writes a new value of the submission queue tail pointer (SQTP) to the submission queue tail doorbell resister corresponding to this certain submission queue (SQ), thereby notifying the SSD 3 that the one or more new commands are placed into the submission queue (SQ). A difference between the new value of the submission queue tail pointer (SQTP) and the previous value of this submission queue tail pointer (SQTP) is indicative of the number of the new commands which have been placed into the submission queue (SQ) by the host 2.

The submission queue head pointer (SQHP) is a pointer updated by the controller 4 when the controller 4 fetches a command. The submission queue head pointer (SQHP) is indicative of a slot in the submission queue (SQ) where a next command to be fetched is stored. The controller 4 fetches one or more new commands from the submission queue (SQ), based on the value of the submission queue head pointer (SQHP).

When the controller 4 fetches one or more new commands from a certain submission queue (SQ), the controller 4 updates the value of the submission queue head pointer (SQHP) to release the slots in the submission queue (SQ) in which these commands are fetched. Each released slot becomes an empty slot that is a slot where a valid command is not stored.

The completion queue head pointer (CQHP) is a pointer updated by the host 2 when the host 2 processes a command completion. The completion queue head pointer (CQHP) is indicative of a slot in the completion queue (CQ) in which a next command completion to be processed is stored. Each slot in the completion queue (CQ) is also referred to as a CQ slot. The host 2 processes a command completion stored in a CQ slot indicated by the completion queue head pointer (CQHP).

The completion queue head pointer (CQHP) is stored in a completion queue head doorbell resister in the host interface 11. When the host 2 processes one or more command completions in a certain completion queue (CQ), the host 2 writes a new value of the completion queue head pointer (CQHP) to the completion queue head doorbell resister corresponding to this certain completion queue (CQ), and thereby releasing each of one or more CQ slots in which one or more processed command completions are stored. Each of the released slots becomes an empty slot which is a slot where a valid command completion is not stored.

The completion queue tail pointer (CQTP) is a pointer updated by the controller 4 when the controller 4 places a command completion into the completion queue (CQ). The completion queue tail pointer (CQTP) is indicative of a next free slot in the completion queue (CQ) (a next free CQ slot). The free CQ slot means a CQ slot available for storing a new completion queue entry, that is, a new command completion. The controller 4 places one or more new command completions into the completion queue (CQ), based on the completion queue tail pointer (CQTP).

The host interface 11 also manages a completion queue allocate pointer (CQAP) for each SQ/CQ pair, that is, for each completion queue (CQ). The completion queue allocate pointer (CQAP) corresponding to a certain completion queue (CQ) is a pointer which is used to obtain the number of free slots in this certain completion queue (CQ). Details of the completion queue allocate pointer (CQAP) will be described later with reference to FIG. 8.

The NAND interface 13 is a NAND controller configured to control the NAND flash memory 5 under the control of the CPU 12. When the NAND flash memory 5 includes a plurality of NAND flash memory chips (NAND flash memory dies), the NAND interface 13 may be connected to the plurality of NAND flash memory chips respectively through a plurality of channels (Ch).

The DRAM interface 14 is a DRAM controller configured to control the DRAM 6 under control of the CPU 12.

A part of the memory region of the DRAM 6 may be used as a region to store a logical-to-physical address translation table (L2P table) 31 and a block management table 32. The block management table 32 is used to manage information indicative of a state of each of a plurality of blocks included in the NAND flash memory 5. The information includes, for example, information indicative of the number of data erase operations for each of the plurality of blocks, information indicative of whether each of the plurality of blocks is an active block or a free block, and the like.

An internal buffer 161 in the controller 4 is used as a memory region for temporarily storing (i) a command and data which are received from the host 2, and (ii) a command completion and data which are to be transmitted to the host 2. For example, the internal buffer 161 is assigned in a memory region of the SRAM 16. Alternatively, the internal buffer 161 may be assigned in a memory region of the DRAM 6.

The DMAC 15 executes data transfer between the memory 102 of the host 2 and the internal buffer 161 under control of the CPU 12.

When data is to be written to the NAND flash memory 5, the ECC encoding/decoding unit 17 encodes the data to be written, thereby adding an error correction code (ECC) to the data as a redundant code. When data is read from the NAND flash memory 5, the ECC encoding/decoding unit 17 performs error correction of the read data by using the ECC added to the read data.

The CPU 12 is a processor configured to control the host interface 11, the NAND interface 13, the DRAM interface 14, the DMAC 15, the SRAM 16, and the ECC encoding/decoding unit 17. The CPU 12 loads a control program (firmware) stored in the NAND flash memory 5 or a ROM (not illustrated) into the DRAM 6 and thus performs various processes by executing the firmware. The firmware may be loaded into the SRAM 16.

The CPU 12 may function as a flash translation layer (FTL) configured to execute management of data in the NAND flash memory 5 and management of blocks in the NAND flash memory 5. The data management executed by the FTL includes management of mapping information between each of logical addresses and each of physical addresses. The logical addresses are used by the host 2 to specify a logical address in a logical address space of the SSD 3. The physical addresses are indicative of physical storage locations in the NAND flash memory 5. A physical address corresponding to a certain logical address indicates a physical storage location in the NAND flash memory 5 where data corresponding to this logical address is written. In general, a logical block address (LBA) can be used as the logical address. The CPU 12 manages mapping between each of the logical addresses and each of the physical addresses by using the L2P table 31.

The CPU 12 can function as a free CQ slot count acquisition unit 21, a command fetch unit 22, and a command processing unit 23. A part or all parts of each of the free CQ slot count acquisition unit 21, the command fetch unit 22, and the command processing unit 23 may also be implemented by dedicated hardware in the controller 4. For example, the command fetch unit 22 may be implemented by the host interface 11.

When a submission queue (SQ) in which a command is to be fetched is selected by the arbitration mechanism of the host interface 11, the free CQ slot count acquisition unit 21 calculates the number of free slots (free CQ slots) among a plurality of slots included in a completion queue (CQ) associated with this selected submission queue (SQ), that is, the number of slots in the completion queue (CQ) available for storing new command completions.

The calculated number of free CQ slots is used to determine an upper limit of the number of commands which can be fetched from the selected submission queue (SQ) at a time. That is, a maximum number of commands which can be fetched from the selected submission queue (SQ) at a time is the number of calculated free CQ slots.

The command fetch unit 22 determines the number of commands to be fetched from the selected submission queue (SQ), with the number of calculated free CQ slots as an upper limit. In other words, the command fetch unit 22 fetches one or more commands, up to the number of free CQ slots at most, from the selected submission queue (SQ).

For example, when the calculated number of free CQ slots is 4, the command fetch unit 22 is allowed to fetch four commands at a maximum from the selected submission queue (SQ). In addition, for example, when the calculated number of free CQ slots is 1, the command fetch unit 22 is allowed to fetch one command at a maximum from the selected submission queue (SQ). In addition, for example, when the calculated number of free CQ slots is 0, the command fetch unit 22 fetches no commands from the selected submission queue (SQ).

Processes for command completions in a certain completion queue (CQ) may be delayed due to unreasonable behavior of the host 2 and/or poor performance of the host 2. The unreasonable behavior of the host 2 means that the host 2 does not process command completions in the completion queue (CQ) for a long time. The poor performance of the host 2 means insufficient performance of the host 2. When the processes of the command completions in the completion queue (CQ) of a certain SQ/CQ pair are delayed, a full state of this completion queue (CQ) may be maintained for a long time. In this case, even if execution of each of the commands which have been already fetched from the submission queue (SQ) of this SQ/CQ pair is completed, the command completion corresponding to each of these commands cannot be placed into this completion queue (CQ). For this reason, these command completions stay within the internal buffer 161.

When the internal buffer 161 is occupied by these staying command completions, no new command can be fetched not only from the submission queue (SQ) of this SQ/CQ pair but also from the submission queue (SQ) of another SQ/CQ pair. Such a negative chain becomes a factor to stop command processes for all SQ/CQ pairs. As a result, a hang-up (or stall) of the entire information processing system 1 including the SSD 3 and the host 2 may be caused in the worst case.

In the present embodiment, when a command is to be fetched from a certain submission queue (SQ), the controller 4 calculates the number of slots in which new command completions can be stored in the completion queue (CQ) (i.e., the number of free CQ slots) associated with this submission queue (SQ). Then, the controller 4 fetches a plurality of commands, whose number is smaller than or equal to the calculated number of free CQ slots, from this submission queue (SQ). Thus, in the present embodiment, when a command is to be fetched from any submission queue (SQ) associated with a certain completion queue (CQ) while one or more free CQ slots exist in the completion queue (CQ), the controller 4 fetches one or more commands from the submission queue (SQ). The maximum number of commands which are fetched from the submission queue (SQ) is equal to the number of the free CQ slots. When no free CQ slots exist in the completion queue (CQ), the controller 4 does not fetch any commands from any submission queue (SQ) associated with the completion queue (CQ) with no free CQ slots.

Therefore, for example, as the number of the free CQ slots of a certain completion queue (CQ) is decreased due to delay in the host 2's processes for command completions, the number of commands to be fetched from any submission queue (SQ) associated with this completion queue (CQ) is also decreased automatically. Thus, while one or more free CQ slots exist in the completion queue (CQ), the number of commands fetched from any submission queue (SQ) associated with this completion queue (CQ) can be adaptively controlled based on the progress of the command completions processes stored in this completion queue (CQ).

As a result, even if any completion queue (CQ) becomes full, it is possible to prevent command completions from staying in the internal buffer 161. Thus, it is possible to improve the reliability of the SSD 3 and the reliability of the entire information processing system 1.

Methods of calculating the number of free CQ slots may include a first calculation method and a second calculation method. The first calculation method is a method of calculating the number of free CQ slots in consideration of the number of completion entries (command completions) actually stored in the completion queue (CQ).

In a case using the first calculation method, the free CQ slot count acquisition unit 21 can calculate the number of free CQ slots of the completion queue (CQ), based on the size of the completion queue (CQ) and the number of command completions stored in the completion queue (CQ).

The size of the completion queue (CQ) may be represented by the total number of slots included in the completion queue (CQ). The number of command completions stored in the completion queue (CQ) is represented by a difference between CQTP corresponding to this completion queue (CQ) and CQHP corresponding to this completion queue (CQ).

Note that, in the case of using the first calculation method, a measure to ensure that the calculated number of free CQ slots matches the actual number of free CQ slots available may be necessary.

As an example of this measure includes exclusively executing a process of placing a command completion into the completion queue (CQ) and a process of fetching a command from the submission queue (SQ), without executing them in parallel For example, until all of command completions corresponding to commands already fetched from any submission queue (SQ) of a certain SQ/CQ pair are placed into the completion queue (CQ) of this SQ/CQ pair, the controller 4 does not start fetching a new command from any submission queue of this certain SQ/CQ pair.

The second calculation method is a calculation method that can allow the process of placing a command completion into the completion queue (CQ) and the process of fetching a command from the submission queue (SQ) to be executed in parallel.

The second calculation method is a method of calculating the number of free CQ slots of the completion queue (CQ) in consideration of the number of all commands already fetched from a certain submission queue (SQ), that is, the number of command completions that have already been determined to be placed into the completion queue (CQ) associated with the submission queue (SQ) in the future.

For example, in the case of calculating the number of free CQ slots of the completion queue (CQ) of a certain SQ/CQ pair by using the second calculation method, the free CQ slot count acquisition unit 21 calculates the number of free CQ slots of this completion queue (CQ) of the SQ/CQ pair by using a first pointer. The first pointer is indicative of a next free slot of the completion queue (CQ) in a case where a first number of command completions are placed into the completion queue (CQ). The first number is equal to the number of commands that have already been fetched from any submission queue (SQ) of the SQ/CQ pair and whose corresponding command completion has not yet been placed into the completion queue (CQ) of this SQ/CQ pair. The value of CQAP of the completion queue (CQ) of this SQ/CQ pair may be used as the first pointer.

For example, when calculating the free CQ slots of the completion queue (CQ) of a certain SQ/CQ pair, the free CQ slot count acquisition unit 21 calculates the number of free CQ slots of this completion queue (CQ), based on the value of CQAP of this completion queue (CQ), the value of CQHP of this completion queue (CQ), and the size of this completion queue (CQ).

When the second calculation method is used, the number of free CQ slots of this completion queue (CQ) can be obtained in consideration of the number of the command completions that have already been determined to be placed into the completion queue (CQ) in the future.

Therefore, it can be ensured that the calculated number of the free CQ slots is not less than the actual number of free CQ slots available. As a result, executing in parallel the process of placing command completions into the completion queue (CQ) and the process of fetching commands from the submission queue (SQ) can be allowed.

The command processing unit 23 interprets and executes each of fetched commands, and executes the process required by each of the commands, for example, a data write operation of writing data to the NAND flash memory 5 or a data read operation of reading data from the NAND flash memory 5. In addition, the command processing unit 23 creates a command completion including a status of a completed command. The status includes information on whether execution of the command is succeeded or failed. Then, the command processing unit 23 places the created command completion into the completion queue (CQ) associated with the submission queue (SQ) from which this command has been fetched.

Next, a configuration example of the host 2 will be described.

The processor 101 is a CPU configured to control an operation of each component in the host 2. The processor 101 executes various types of software (host software) loaded from the SSD 3 or a different storage device connected to the host 2 into the memory 102. The host software includes an operating system, a file system, device drivers, application programs, and the like.

The submission queue (SQ) is a queue used to issue a command for the SSD 3. The completion queue (CQ) is a queue used to receive from the SSD 3 a command completion indicative of a status of a completed command.

The host 2 transmits various commands to the SSD 3 via the submission queue (SQ) included in each SQ/CQ pair. The types of commands transmitted to the SSD 3 can be roughly divided into NVMe commands (I/O commands) defined in the NVMe standard and administrative commands (management commands) defined in the NVMe standard.

The I/O commands include write commands, read commands, and the like. The write command is a command which requires the SSD 3 to write data to the NAND flash memory 5. The read command is a command which requires the SSD 3 to read data from the NAND flash memory 5.

The administrative commands include various commands for control and management of the SSD 3. These commands also include an I/O completion queue create command and an I/O submission queue create command.

The I/O submission queue create command is a command to create an I/O submission queue. The I/O submission queue is a submission queue used to issue the I/O command to the SSD 3. The I/O submission queue create command specifies an identifier of an I/O submission queue to be created, a size of the I/O submission queue to be created, an identifier of the I/O completion queue to be associated with the I/O submission queue to be created, priority of the I/O submission queue to be created, an address of a memory region in the memory 102 of the host 2 to which the I/O submission queue to be created is assigned, and the like.

The I/O completion queue create command is a command to create an I/O completion queue. The I/O completion queue is a completion queue to be used to receive from the SSD 3 a command completion indicative of a status of a completed I/O command. The I/O completion queue create command specifies an identifier of an I/O completion queue to be created, a size of the I/O completion queue to be created, priority of the I/O completion queue to be created, an address of a memory region in the memory 102 of the host 2 to which the I/O completion queue to be created is assigned, and the like.

The maximum size of each of the I/O submission queue and the I/O completion queue is 65,535 slots, and the minimum size of each of the I/O submission queue and the I/O completion queue is 2 slots. The host 2 can specify any size within a range from the minimum size to the maximum size for each I/O submission queue to be created or each I/O completion queue to be created. The controller 4 manages the sizes of individual I/O submission queues specified by the host 2 and the sizes of individual I/O completion queues specified by the host 2.

In the following descriptions, it is assumed that the submission queue and the completion queue included in each SQ/CQ pair are the I/O submission queue and the I/O completion queue. However, the command processes of the present embodiment can be applied not only to the I/O submission queue and the I/O completion queue, but also to an administrative submission queue and an administrative completion queue. The administrative submission queue is used to store the administrative command to be transmitted to SSD 3. The administrative completion queue is used to store a command completion corresponding to the administrative command.

Next, a state transition of a queue (submission queue or completion queue) will be described with reference to FIG. 2, FIG. 3, FIG. 4 and FIG. 5.

FIG. 2 illustrates a relationship between the head pointer and the tail pointer in a case where the queue (submission queue or completion queue) is empty.

The queue includes a plurality of slots. Each of the plurality of slots can store one command or one command completion. The command or the command completion is also referred to as "queue entry" or "entry". The position in the memory 102 to which the queue is assigned is indicated by a queue base address corresponding to this queue. The size of the queue can be represented with the total number of slots included in the queue. A case in which the size of the queue is 8 slots is exemplified here.

The queue is managed by using the head pointer and the tail pointer each corresponding to this queue. The tail pointer is indicative of a next free slot in the queue. The tail pointer is updated by a producer which places an entry (i.e., command or command completion) into the queue. The producer places a command or a command completion into the next free slot indicated by the tail pointer and increments the tail pointer such that the value of the tail pointer is incremented by 1. When the incremented value of the tail pointer exceeds the final slot (in this example, #7) of the queue, the tail pointer is returned to 0.

The head pointer is indicative of a slot which stores a next entry (next command or next command completion) to be consumed. The head pointer is updated by a consumer which acquires an entry (i.e., command or command completion) from the queue. The consumer acquires a command or a command completion from the slot indicated by the head pointer, and increments the head pointer such that the value of the head pointer is incremented by 1. When the incremented value of the head pointer exceeds the final slot (in this example, #7) of the queue, the head pointer is returned to 0.

Here, that a queue is empty means that all slots in the queue are empty. In addition, that a slot is empty means that a valid queue entry is not stored in the slot.

When the value of the head pointer is equal to the value of the tail pointer, the queue is empty. FIG. 2 illustrates an example that both the head pointer and the tail pointer indicate the same slot #3.

FIG. 3 illustrates an operation of updating the tail pointer in a case where three queue entries (three commands or three command completions) are placed into the slots #3 to #5 of the queue. When the producer places three commands or three command completions into the slots #3 to #5, the producer updates (increments) the tail pointer such that a new value of the tail pointer indicates the slot #6.

FIG. 4 illustrates an operation of updating the head pointer in a case where one command or one command completion stored in the slot #3 of the queue is consumed. When the consumer acquires a command or a command completion from the slot #3 indicated by a current value of the head pointer, the consumer updates (increments) the head pointer such that a new value of the head pointer indicates the slot #4.

FIG. 5 illustrates a relationship between the head pointer and the tail pointer in a case where the queue is full. When the queue is full, additional command or command completion cannot be placed into this queue. When the value of the tail pointer is smaller than the value of the head pointer by 1, the queue is full. Therefore, the total number of commands or command completions stored in the queue which is in the full state is equal to a number which is smaller than the size of the queue by 1. In this example, the size of the queue is 8, and the total number of commands or command completions stored in the queue which is in the full state is 7. That is, any one slot of eight slots included in the queue is always maintained in empty. Thus, under the NVMe standard, the number of free slots which are slots available for storing a new command (or a new command completion) is equal to the number which is smaller than the number of the slots included in the queue by 1. For example, when the queue including eight slots is empty, the number of slots (free slots) available for storing a new command (or a new command completion), of the eight slots each being empty, is 7.

Next, a command process of the present embodiment will be described. A procedure of a command process according to a comparative example will be described prior to explanation of the command process of the present embodiment. The procedure of the command process according to the comparative example fetches any number of commands from a submission queue (SQ) without considering a state of a completion queue (CQ) associated with the submission queue (SQ).

FIG. 6 is a diagram illustrating a procedure of the command process according to the comparative example. FIG. 6 illustrates a procedure after a command is issued by the host 2 until a command completion corresponding to this command is processed by the host 2.

step 1: First, the host 2 places one or more new commands to be transmitted to the SSD 3 into one or more free SQ slots of the submission queue (SQ). The one or more new commands are placed into one or more free SQ slots starting from a slot indicated by the current value of the submission queue tail pointer (SQTP). The new commands placed into the submission queue (SQ) may be write commands, read commands or other commands. In FIG. 6, each of the commands placed into the submission queue (SQ) is denoted as "CMD".

step 2: To notify the controller 4 of the SSD 3 that the new one or more commands have been placed into the submission queue (SQ), the host 2 performs write access to the submission queue tail doorbell resister in the SSD 3 corresponding to this submission queue (SQ) and updates the value of the submission queue tail pointer (SQTP) corresponding to this submission queue (SQ). The value of the submission queue tail pointer (SQTP) is incremented by the number of new commands placed into the submission queue (SQ). Such update of the submission queue tail pointer (SQTP) becomes a trigger for the controller 4 to start the processes of the respective commands placed into the submission queue (SQ).

step 3: The controller 4 can recognize the number of the new commands placed into the submission queue (SQ), based on a difference between the new value of the submission queue tail pointer (SQTP) and the previous value of the submission queue tail pointer (SQTP). The controller 4 fetches one or more any number of commands from the submission queue (SQ). Each of the fetched commands is temporarily stored in the internal buffer 161 in the controller 4.

step 4: The controller 4 updates the value of the submission queue head pointer (SQHP) corresponding to the submission queue (SQ) such that the value of the submission queue head pointer (SQHP) corresponding to this submission queue (SQ) is incremented by the number of the commands fetched in step 3.

step 5: The controller 4 executes each of the fetched command. The order in which these commands are executed is not limited. These commands may be executed in an order different from the order in which these commands are fetched. In the process of executing each command, the controller 4 executes data transfer from the memory 102 of the host 2 to the internal buffer 161 of the controller 4 or data transfer from the internal buffer 161 to the memory 102 of the host 2 as needed.

step 6: When the execution of a certain command is completed, the controller 4 first updates the completion queue tail pointer (CQTP) corresponding to the completion queue (CQ) associated with the submission queue (SQ) from which the completed command is fetched, and thereby incrementing the value of this completion queue tail pointer (CQTP) by 1.

step 7: The controller 4 places a new command completion indicative of a status of this completed command into the next free CQ slot of this completion queue (CQ). In FIG. 6, each of the command completions placed into the completion queue (CQ) is denoted as "CPL".

step 8: The controller 4 generates an interrupt signal to the host 2, and notifies the host 2 that the new command completion has been placed into the completion queue (CQ).

step 9: The host 2 acquires a command completion from the CQ slot indicated by the current value of the completion queue head pointer (CQHP) and processes the acquired command completion.

step 10: The host 2 performs write access to the completion queue head doorbell resister in the SSD 3 corresponding to this completion queue (CQ) and updates the value of the completion queue head pointer (CQHP). The value of the completion queue head pointer (CQHP) is incremented by the number of the command completions processed in step 9.

In the command process according to the comparative example, the controller 4 continues fetching commands from any submission queue (SQ) of the host 2 as long as available memory regions remain in the internal buffer 161. For this reason, when the process of the command completions executed by the host 2 is delayed, several new command completions which are to be placed into a certain completion queue (CQ) may stay in the internal buffer 161. An example of the command process according to the comparative example will be described below with reference to FIG. 7A to FIG. 7G.

FIG. 7A is a diagram illustrating a first process of the command process according to the comparative example. The host 2 creates for example two SQ/CQ pairs, that is, SQ/CQ pair X and SQ/CQ pair Y in the memory 102.

The SQ/CQ pair X includes one submission queue (SQ) and one completion queue (CQ) associated with this submission queue (SQ). The size of each of the submission queue (SQ) and the completion queue (CQ) is, for example, 8 slots.

Each of the submission queue (SQ) and the completion queue (CQ) included in the SQ/CQ pair X is empty immediately after the creation of the SQ/CQ pair X. Therefore, SQHP and SQTP corresponding to the submission queue (SQ) of the SQ/CQ pair X are indicative of the same slot (in this example, the slot #0). Similarly, CQHP and CQTP corresponding to the completion queue (CQ) of the SQ/CQ pair X are also indicative of the same slot (in this example, the slot #0).

The SQ/CQ pair Y includes one submission queue (SQ) and one completion queue (CQ) associated with this submission queue (SQ). The size of the submission queue (SQ) is, for example, 8 slots. On the other hand, the size of the completion queue (CQ) is, for example, 2 slots, which is the minimum size defined in the NVMe standard. Each of the submission queue (SQ) and the completion queue (CQ) included in the SQ/CQ pair Y is empty immediately after the creation of the SQ/CQ pair Y. Therefore, the SQHP and the SQTP corresponding to the submission queue (SQ) of the SQ/CQ pair Y are indicative of the same slot (in this example, the slot #0). Similarly, the CQHP and the CQTP corresponding to the completion queue (CQ) of the SQ/CQ pair Y are also indicative of the same slot (in this example, the slot #0).

The controller 4 includes a reception buffer for temporarily storing each of the fetched commands and a transmission buffer for temporarily storing the created command completions. The reception buffer and the transmission buffer are allocated in, for example, the internal buffer 161 described with reference to FIG. 1.

FIG. 7B is a diagram illustrating a second process of the command process according to the comparative example for two SQ/CQ pairs.

The host 2 places one or more commands into each of the submission queue (SQ) of the SQ/CQ pair X and the submission queue (SQ) of the SQ/CQ pair Y. For example, seven commands (i.e., commands 0 to 6) are placed into the submission queue (SQ) of the SQ/CQ pair X. In this case, the host 2 updates the value of the SQTP corresponding to the submission queue (SQ) of the SQ/CQ pair X from the value indicative of the slot #0 to the value indicative of the slot #7. The submission queue (SQ) of the SQ/CQ pair X thereby becomes full.

For example, four commands (i.e., command 0' to command 3') are placed into the submission queue (SQ) of the SQ/CQ pair Y. In this case, the host 2 updates the value of the SQTP corresponding to the submission queue (SQ) of the SQ/CQ pair Y from the value indicative of the slot #0 to the value indicative of the slot #4.

Figure 7C:
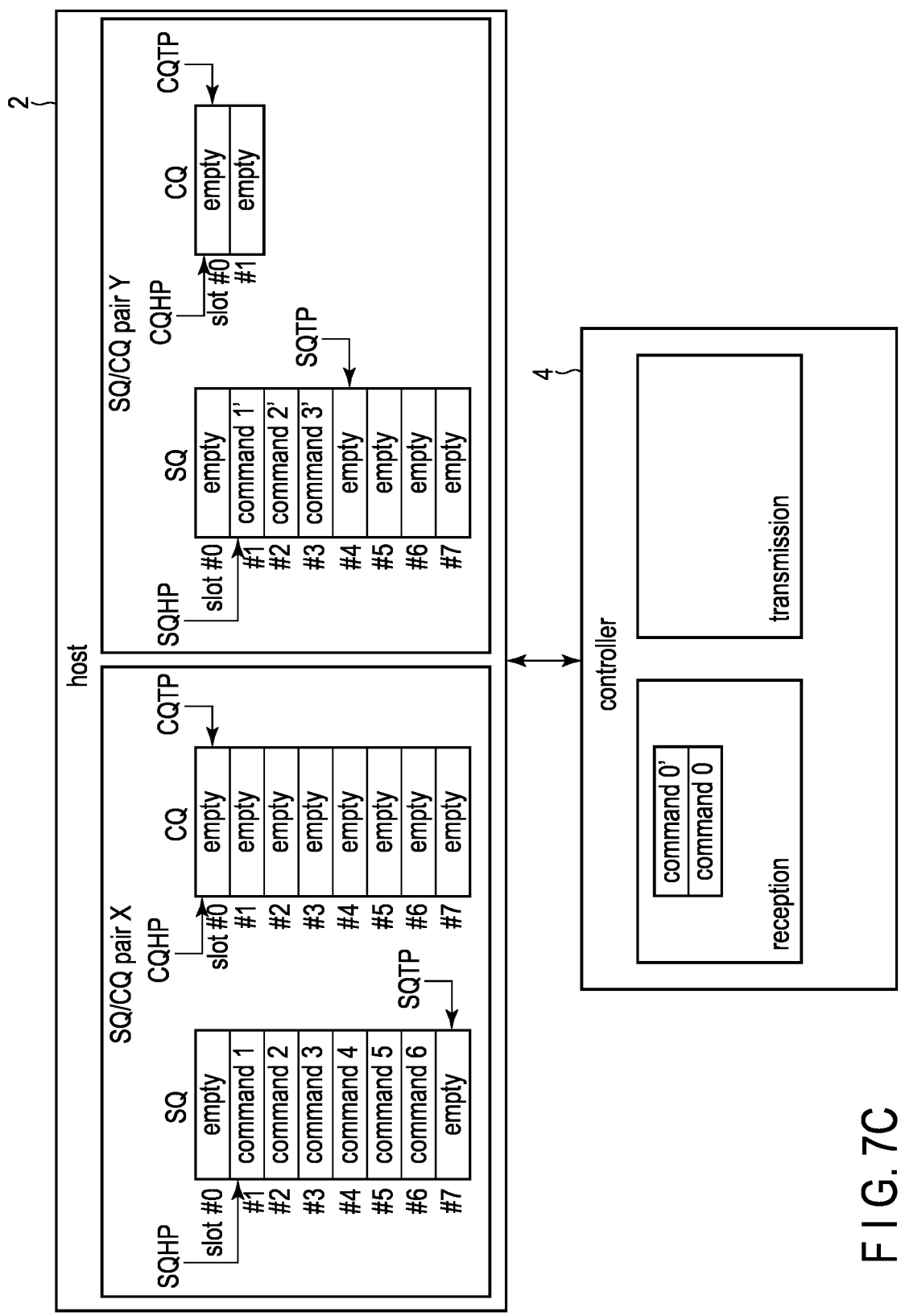
FIG. 7C is a diagram illustrating a third process of the command process according to the comparative example.

FIG. 7C is a diagram illustrating a third process of the command process according to the comparative example for two SQ/CQ pairs.

The controller 4 selects a submission queue (SQ) from which commands are to be fetched, from the submission queue (SQ) of the SQ/CQ pair X and the submission queue (SQ) of the SQ/CQ pair Y, by using the arbitration mechanism. Then, the controller 4 fetches one or more commands from the selected submission queue (SQ). In the following descriptions, it is assumed that one command in the submission queue (SQ) of the SQ/CQ pair X and one command in the submission queue (SQ) of the SQ/CQ pair Y are alternately fetched.

The controller 4 fetches the command 0 from the submission queue (SQ) of the SQ/CQ pair X and stores the command 0 in the reception buffer. In addition, the controller 4 fetches the command 0' from the submission queue (SQ) of the SQ/CQ pair Y and stores the command 0' in the reception buffer.

Then, the controller 4 updates the value of the SQHP corresponding to the submission queue (SQ) of the SQ/CQ pair X from the value indicative of the slot #0 to the value indicative of the slot #1. Similarly, the controller 4 updates the value of the SQHP corresponding to the submission queue (SQ) of the SQ/CQ pair Y from the value indicative of the slot #0 to the value indicative of the slot #1.

After this, the controller 4 continues fetching commands from each of two submission queues (SQ) as long as available free memory regions exist in the reception buffer.

Figure 7D:
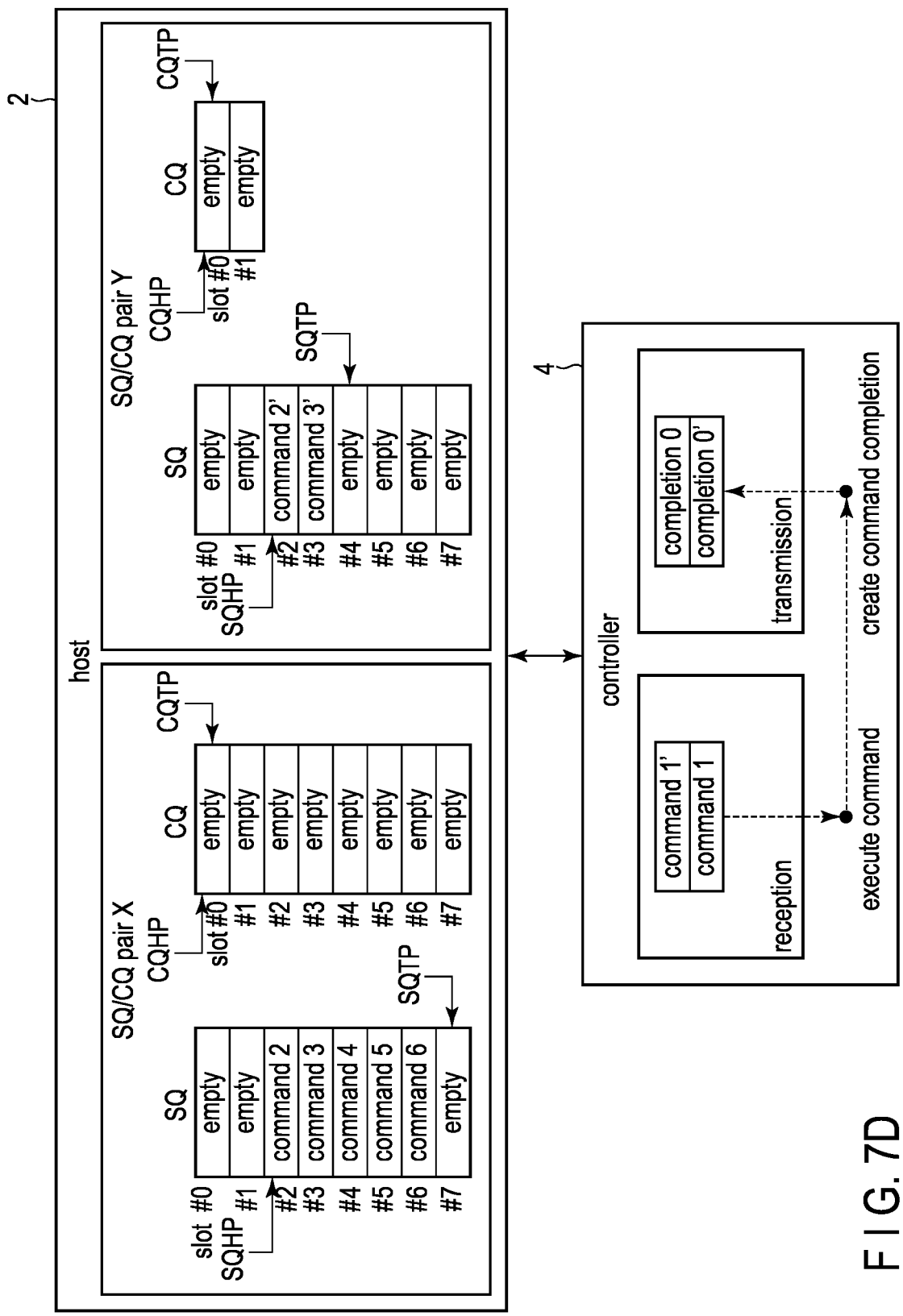
FIG. 7D is a diagram illustrating a fourth process of the command process according to the comparative example.

FIG. 7D is a diagram illustrating a fourth process of the command process according to the comparative example for two SQ/CQ pairs.

The controller 4 executes the command 0 and the command 0' stored in the reception buffer. When completing the execution of the command 0, the controller 4 creates a command completion 0 indicative of a status of the completed command 0 and stores the created command completion 0 in the transmission buffer. Similarly, when completing the execution of the command 0', the controller 4 creates a command completion 0' indicative of a status of the completed command 0' and stores the created command completion 0' in the transmission buffer.

Both the two memory regions in the reception buffer become free memory regions available for storing a new command by completing the execution of the command 0 and the command 0'.

Therefore, the controller 4 fetches the command 1 from the submission queue (SQ) of the SQ/CQ pair X and stores the fetched command 1 in the reception buffer. In addition, the controller 4 fetches the command 1' from the submission queue (SQ) of the SQ/CQ pair Y and stores the fetched command 1' in the reception buffer. Then, the controller 4 updates the value of the SQHP corresponding to the submission queue (SQ) of the SQ/CQ pair X from the value indicative of the slot #1 to the value indicative of the slot #2. Similarly, the controller 4 updates the value of the SQHP corresponding to the submission queue (SQ) of the SQ/CQ pair Y from the value indicative of the slot #1 to the value indicative of the slot #2.

Figure 7E:
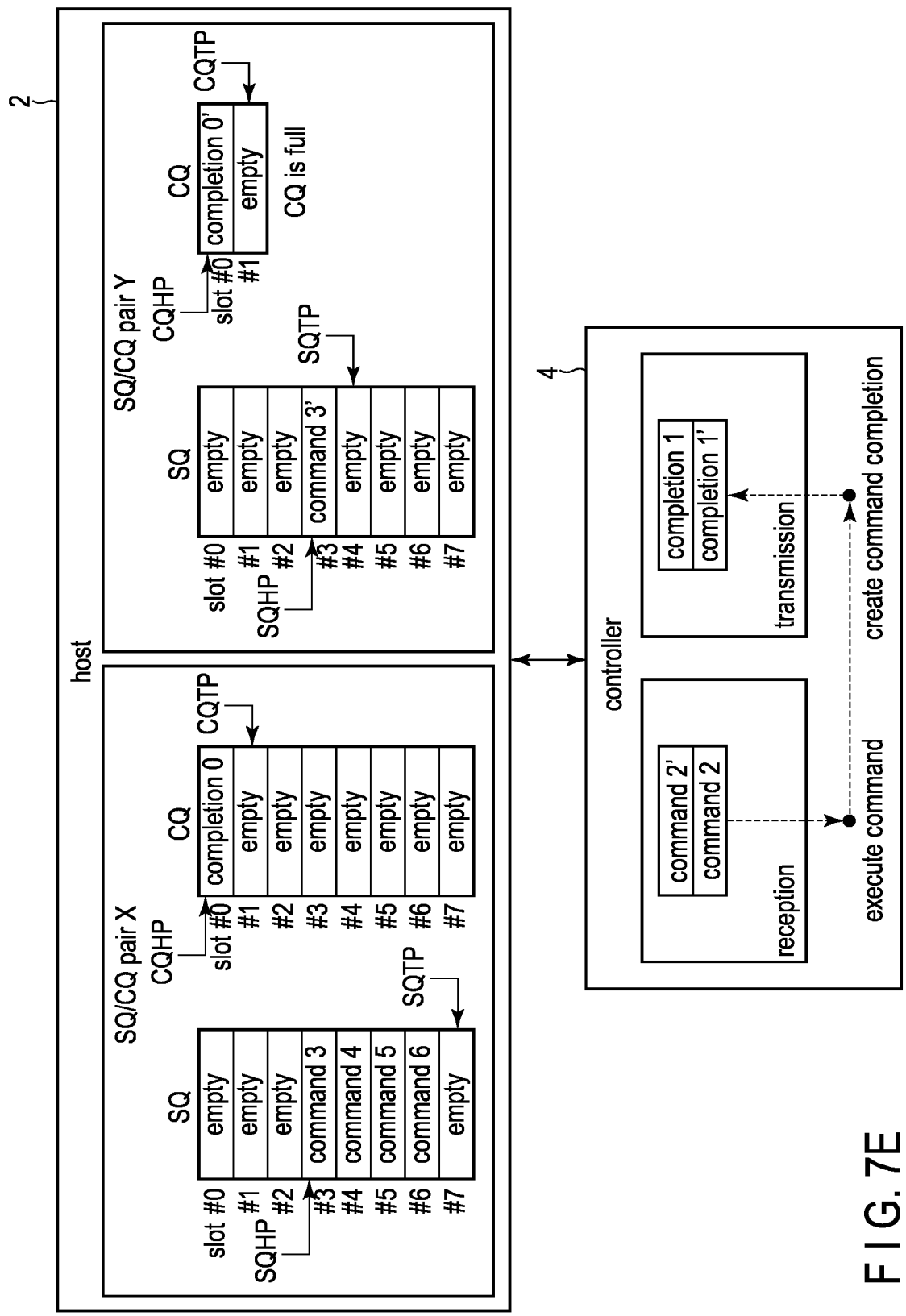
FIG. 7E is a diagram illustrating a fifth process of the command process according to the comparative example.

FIG. 7E is a diagram illustrating a fifth process of the command process according to the comparative example for two SQ/CQ pairs.

The controller 4 places the command completion 0 stored in the transmission buffer into the slot #0 of the completion queue (CQ) of the SQ/CQ pair X. Then, the controller 4 updates the CQTP corresponding to the completion queue (CQ) of the SQ/CQ pair X from the value indicative of the slot #0 to the value indicative of the slot #1. Note that the controller 4 may first update the CQTP from the value indicative of the slot #0 to the value indicative of the slot #1 and then place the command completion 0 stored in the transmission buffer into the slot #0 of the completion queue (CQ) of the SQ/CQ pair X.

In addition, the controller 4 places the command completion 0' stored in the transmission buffer into the slot #0 of the completion queue (CQ) of the SQ/CQ pair Y. Then, the controller 4 updates the CQTP corresponding to the completion queue (CQ) of the SQ/CQ pair Y from the value indicative of the slot #0 to the value indicative of the slot #1. The completion queue (CQ) of the SQ/CQ pair Y thereby becomes full. Note that the controller 4 may first update the CQTP from the value indicative of the slot #0 to the value indicative of the slot #1 and then place the command completion 0' stored in the transmission buffer into the slot #0 of the completion queue (CQ) of the SQ/CQ pair Y.

Since the command completion 0 and the command completion 0' are placed into the completion queue (CQ) of the SQ/CQ pair X and the completion queue (CQ) of the SQ/CQ pair Y, respectively, the two memory regions in the transmission buffer become free memory regions available for storing a new command completion.

The controller 4 executes the command 1 and the command 1' stored in the reception buffer. When completing the execution of the command 1, the controller 4 creates a command completion 1 indicative of a status of the completed command 1 and stores the created command completion 1 in the transmission buffer. Similarly, when completing the execution of the command 1', the controller 4 creates a command completion 1' indicative of a status of the completed command 1' and stores the created command completion 1' in the transmission buffer.

The two memory regions in the reception buffer become free memory regions by completing the execution of the command 1 and the command 1'.

The controller 4 therefore fetches the command 2 from the submission queue (SQ) of the SQ/CQ pair X and stores the command 2 in the reception buffer. In addition, the controller 4 fetches the command 2' from the submission queue (SQ) of the SQ/CQ pair Y and stores the command 2' in the reception buffer.

Then, the controller 4 updates the value of the SQHP corresponding to the submission queue (SQ) of the SQ/CQ pair X from the value indicative of the slot #2 to the value indicative of the slot #3. Similarly, the controller 4 updates the value of the SQHP corresponding to the submission queue (SQ) of the SQ/CQ pair Y from the value indicative of the slot #2 to the value indicative of the slot #3.

Figure 7F:
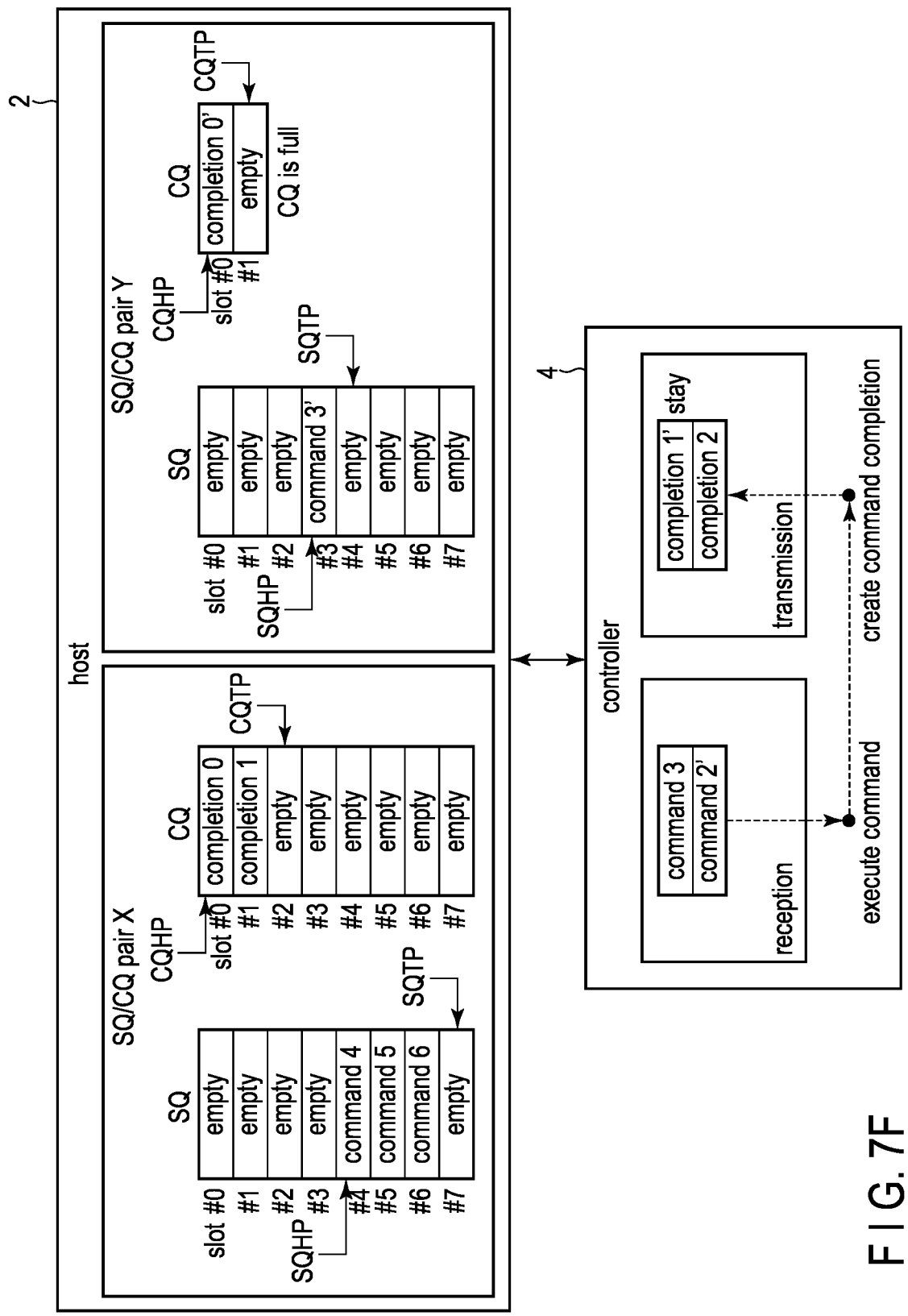
FIG. 7F is a diagram illustrating a sixth process of the command process according to the comparative example.

FIG. 7F is a diagram illustrating a sixth process of the command process according to the comparative example for two SQ/CQ pairs.

The controller 4 places the command completion 1 stored in the transmission buffer into slot #1 of the completion queue (CQ) of the SQ/CQ pair X. Then, the controller 4 updates the CQTP corresponding to the completion queue (CQ) of the SQ/CQ pair X from the value indicative of the slot #1 to the value indicative of the slot #2. Note that the controller 4 may first update the CQTP from the value indicative of the slot #1 to the value indicative of the slot #2 and then place the command completion 1 stored in the transmission buffer into the slot #1 of the completion queue (CQ) of the SQ/CQ pair X.

On the other hand, the completion queue (CQ) of the SQ/CQ pair Y in which the command completion 1' is to be placed is full. Therefore, the controller 4 cannot place the command completion 1' into the completion queue (CQ) of the SQ/CQ pair Y. The command completion 1' continues staying in the transmission buffer as long as the command completion 0' in the completion queue (CQ) of the SQ/CQ pair Y is not processed by the host 2.

When the command completion 1 is placed into the completion queue (CQ) of SQ/CQ pair X, one new command completion can be stored in the transmission buffer.

Therefore, the controller 4 executes the command 2 stored in the reception buffer. When completing the execution of the command 2, the controller 4 creates a command completion 2 indicative of a status of the completed command 2 and stores the created command completion 2 in the transmission buffer.

One new command can be stored in the reception buffer by completing the execution of the command 2. The controller 4 therefore fetches the command 3 from the submission queue (SQ) of the SQ/CQ pair X and stores the command 3 in the reception buffer. Then, the controller 4 updates the value of the SQHP corresponding to the submission queue (SQ) of the SQ/CQ pair X from the value indicative of the slot #3 to the value indicative of the slot #4.

Figure 7G:
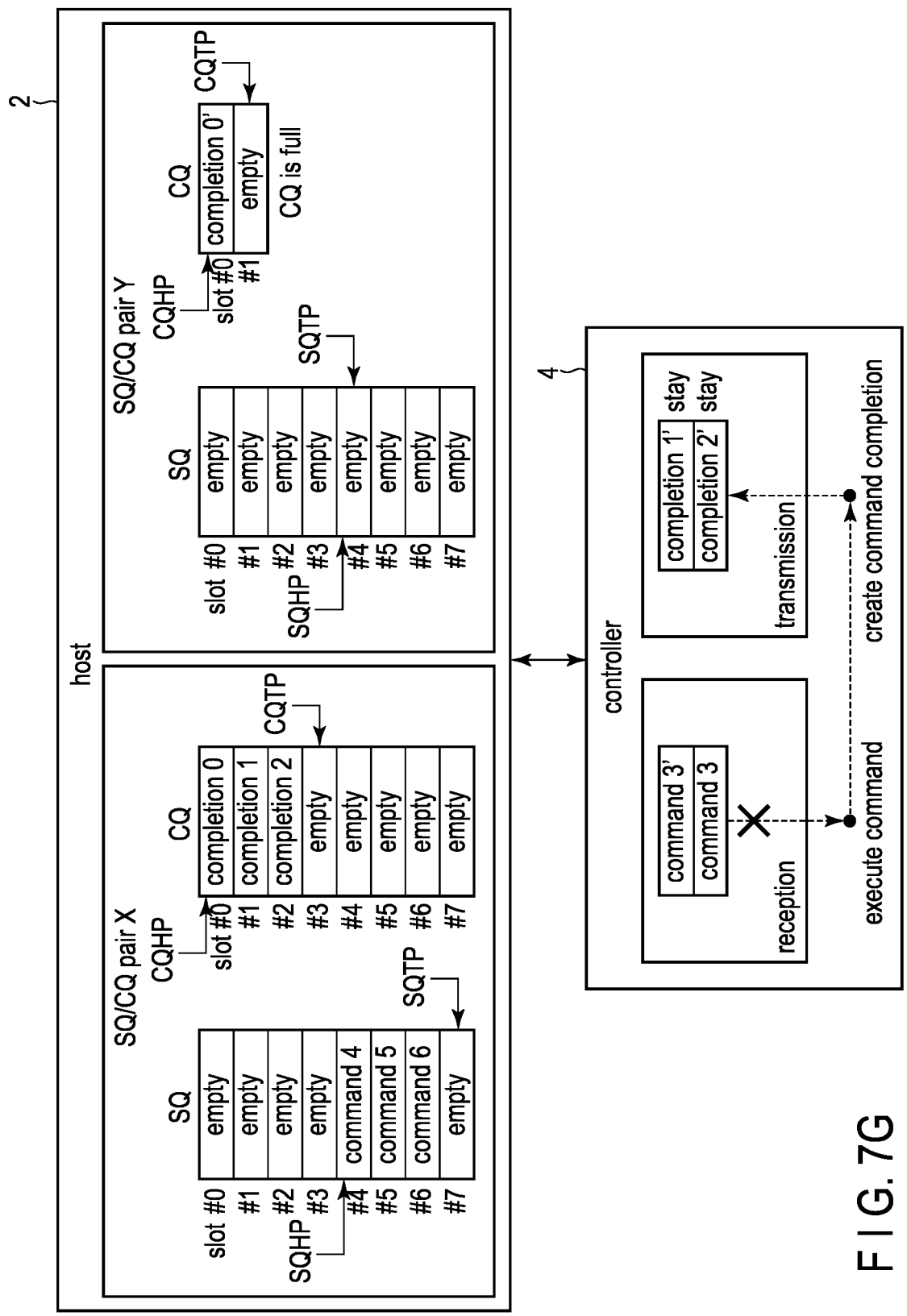
FIG. 7G is a diagram illustrating a seventh process of the command process according to the comparative example.

FIG. 7G is a diagram illustrating a seventh process of the command process according to the comparative example for two SQ/CQ pairs.

The controller 4 places the command completion 2 stored in the transmission buffer into the slot #2 of the completion queue (CQ) of the SQ/CQ pair X. Then, the controller 4 updates the CQTP corresponding to the completion queue (CQ) of the SQ/CQ pair X from the value indicative of the slot #2 to the value indicative of the slot #3. Note that the controller 4 may first update the CQTP from the value indicative of the slot #2 to the value indicative of the slot #3 and then place the command completion 2 stored in the transmission buffer into the slot #2 of the completion queue (CQ) of the SQ/CQ pair X.

When the command completion 2 is placed into the completion queue (CQ) of SQ/CQ pair X, one new command completion can be stored in the transmission buffer. Therefore, the controller 4 executes the command 2' stored in the reception buffer. When completing the execution of the command 2', the controller 4 creates a command completion 2' indicative of a status of the completed command 2' and stores the created command completion 2' in the transmission buffer.

One new command can be stored in the reception buffer by completing the execution of the command 2'. In addition, the controller 4 fetches the command 3' from the submission queue (SQ) of the SQ/CQ pair Y and stores the command 3' in the reception buffer. Then, the controller 4 updates the value of the SQHP corresponding to the submission queue (SQ) of the SQ/CQ pair Y from the value indicative of the slot #3 to the value indicative of the slot #4.

Since the completion queue (CQ) of the SQ/CQ pair Y is full, the controller 4 cannot place the command completion 1' and the command completion 2' stored in the transmission buffer into the completion queue (CQ) of the SQ/CQ pair Y. For this reason, both the command completion 1' and the command completion 2' stay in the transmission buffer. That is, the transmission buffer is occupied by the command completion 1' and the command completion 2' that cannot be placed into the completion queue (CQ) of the SQ/CQ pair Y.

Since the free storage regions do not exist in the transmission buffer, the command 3', which has already been fetched from the submission queue (SQ) of the SQ/CQ pair Y, cannot be executed.

On the other hand, a plurality of free slots exist in the completion queue (CQ) of the SQ/CQ pair X. However, the transmission buffer is already occupied by the command completion 1' and the command completion 2' that cannot be placed into the completion queue (CQ) of the SQ/CQ pair Y. Therefore, although the completion queue (CQ) of the SQ/CQ pair X is not full, the command 3 fetched from the SQ/CQ pair X cannot be executed. Furthermore, since the reception buffer is also occupied by the command 3' and the command 3 whose execution cannot be started, new commands cannot be fetched from the submission queue (SQ) of the SQ/CQ pair X.

Thus, while the command completion 1' and the command completion 2' that are to be placed into the completion queue (CQ) of the SQ/CQ pair Y stay in the transmission buffer, not only the command process of the SQ/CQ pair Y is stopped, but also the command process of all other SQ/CQ pairs is stopped.

Figure 8:
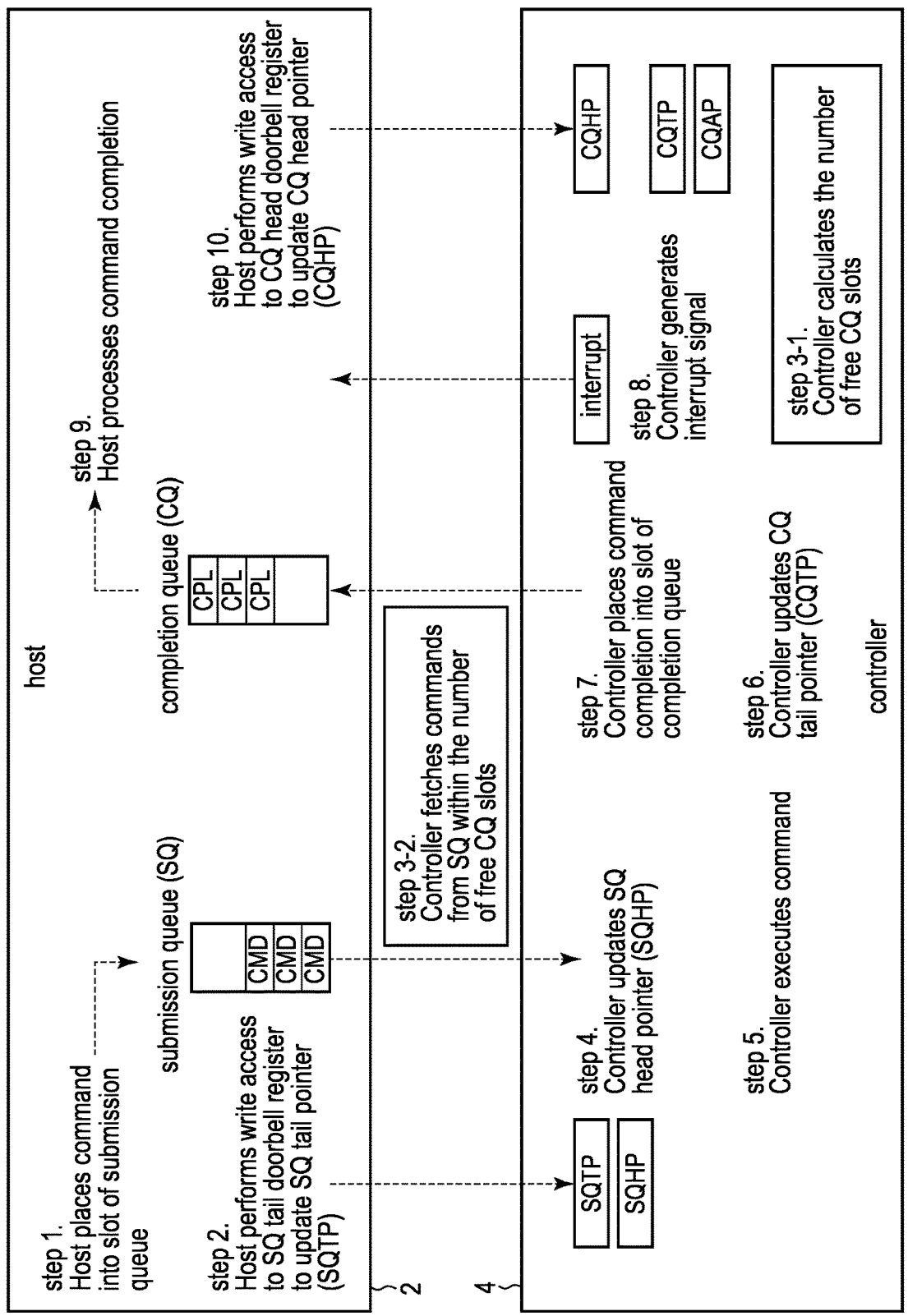
FIG. 8 is a diagram illustrating a procedure of a command process executed in the memory system according to the embodiment.

Next, a command process according to the embodiment will be described. FIG. 8 is a diagram illustrating a procedure of a command process according to the embodiment.

In the command process according to the embodiment, processes of steps 1 to 2 illustrated in FIG. 8 are first executed by the host 2. Since the processes of steps 1 to 2 illustrated in FIG. 8 are the same as the processes of steps 1 to 2 of the command process according to the comparative example described with reference to FIG. 6, descriptions thereof are omitted here. Next, processes of step 3-1 and step 3-2 illustrated in FIG. 8 are executed as follows.

step 3-1: When the controller 4 is to fetch the command from the submission queue (SQ), the controller 4 determines an upper limit of the number of commands to be fetched from the submission queue (SQ), based on a state of the completion queue (CQ) associated with the submission queue (SQ). In this case, the controller 4 first calculates the number of slots in this completion queue (CQ) available for storing a command completion, that is, the number of free CQ slots of this completion queue (CQ).

step 3-2: The controller 4 determines the number of the commands to be fetched up to the number of the calculated free CQ slots as an upper limit. For example, when the number of the commands stored in the submission queue (SQ) is 4 and when the number of the free CQ slots is 3, the controller 4 may determine the number of the commands to be fetched to be 3. In addition, for example, when the number of the commands stored in the submission queue (SQ) is 2 and when the number of the free CQ slots is 3, the controller 4 may determine the number of the commands to be fetched to be 2. Then, the controller 4 fetches the determined number of the commands from the submission queue (SQ).

Next, the controller 4 executes processes of steps 4 to 10 illustrated in FIG. 8. Since the processes of steps 4 to 10 of FIG. 8 are the same as the processes of steps 4 to 10 of the command process according to the comparative example described with reference to FIG. 6, descriptions thereof are omitted here.

Next, an example of a command process according to the embodiment will be described with reference to FIG. 9A to FIG. 9H. An example of the command process according to the embodiment will be described by exemplifying a case of calculating the number of the free CQ slots by using the above-described second calculation method. In addition, since the command process is executed in the same procedure for any pair of a plurality of SQ/CQ pairs, the example of the command process according to the embodiment will be described by focusing a certain SQ/CQ pair.

Figure 9A:
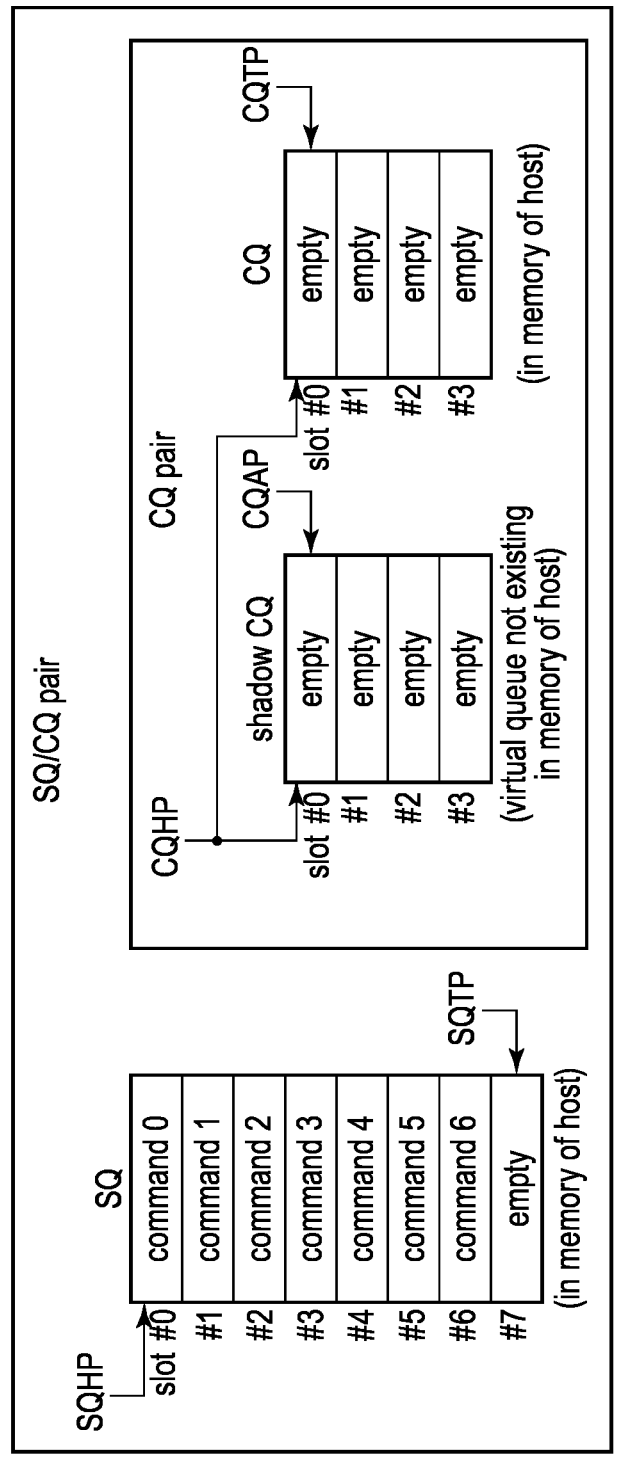
FIG. 9A is a diagram illustrating a first process of the command process executed in the memory system according to the embodiment.

FIG. 9A is a diagram illustrating a first process of the command process for the certain SQ/CQ pair.

The SQ/CQ pair includes one submission queue (SQ) and one completion queue (CQ) associated with this submission queue (SQ) The size of the submission queue (SQ) is, for example, 8 slots. The size of the completion queue (CQ) is, for example, 4 slots. When the completion queue (CQ) including 4 slots is empty, the number of the free CQ slots available for storing a new command completion is 3. This is because any one slot of the queue (CQ) should always be maintained empty under the NVMe standard as described with reference to FIG. 3.

The controller 4 manages a completion queue allocate pointer (CQAP) to calculate the number of the free CQ slots by using the above-described second calculation method.

The CQAP is used to obtain the number of the free CQ slots in this completion queue (CQ). The CQAP is used as the first pointer indicative of a next free slot (next free CQ slot) of the completion queue (CQ) in a case where a first number of command completions are placed into the completion queue (CQ). The first number is equal to the number of commands that have already been fetched from the submission queue (SQ) and whose corresponding command completion has not yet been placed into the completion queue (CQ).

The controller 4 manages the value of the CQAP by using a shadow completion queue (shadow CQ) having the same size as the completion queue (CQ). The shadow completion queue and the completion queue (CQ) are associated with each other in a 1:1 mapping. When the total number of the slots included in the completion queue (CQ) is 4, the total number of the slots included in the shadow completion queue (CQ) is also 4. When the shadow completion queue (CQ) including 4 slots is empty, the number of the free slots in the shadow completion queue (CQ) which can be reserved for new command completions is 3.

Note that the submission queue (SQ) and the completion queue (CQ) exist in the memory 102 of the host 2, but the shadow completion queue is a virtual queue that does not exist in the memory 102 of the host 2 or the controller 4.

The shadow completion queue is used to indicate a future state of the completion queue (CQ). The CQAP is used as a pointer indicative of a next free slot in the shadow completion queue.

In addition, the CQHP corresponding to the completion queue (CQ) is used not only to indicate a slot in the completion queue (CQ) storing a next command completion to be processed, but also to indicate a slot in the shadow completion queue reserved for storing a next command completion to be processed. That is, the CQHP is shared by the completion queue (CQ) and the shadow completion queue.

First, the controller 4 determines the number of the free slots of the shadow completion queue to be the number of the free CQ slots of the completion queue (CQ).

The number of the free slots of the shadow completion queue can be obtained from the completion queue head pointer (CQHP), the completion queue allocate pointer (CQAP), and the size of the completion queue (CQ), in the following expression.

Number of free slots of shadow CQ=(CQ size−1)−(CQAP−CQHP)

Thus, the number of the free slots of the shadow completion queue can be obtained by subtracting a difference between the CQAP and the CQHP from a value which is smaller than the number of the slots included in the completion queue (CQ) by 1.

In FIG. 9A, the number of the free slots of the shadow completion queue is 3 since the shadow completion queue is empty. The controller 4 thereby determines that three commands at a maximum can be fetched from the submission queue (SQ).

The host 2 stores seven commands (i.e., commands 0 to 6) in the submission queue (SQ). The host 2 updates the value of the submission queue tail pointer (SQTP) from the value indicative of the slot #0 to the value indicative of the slot #7.

Figure 9B:
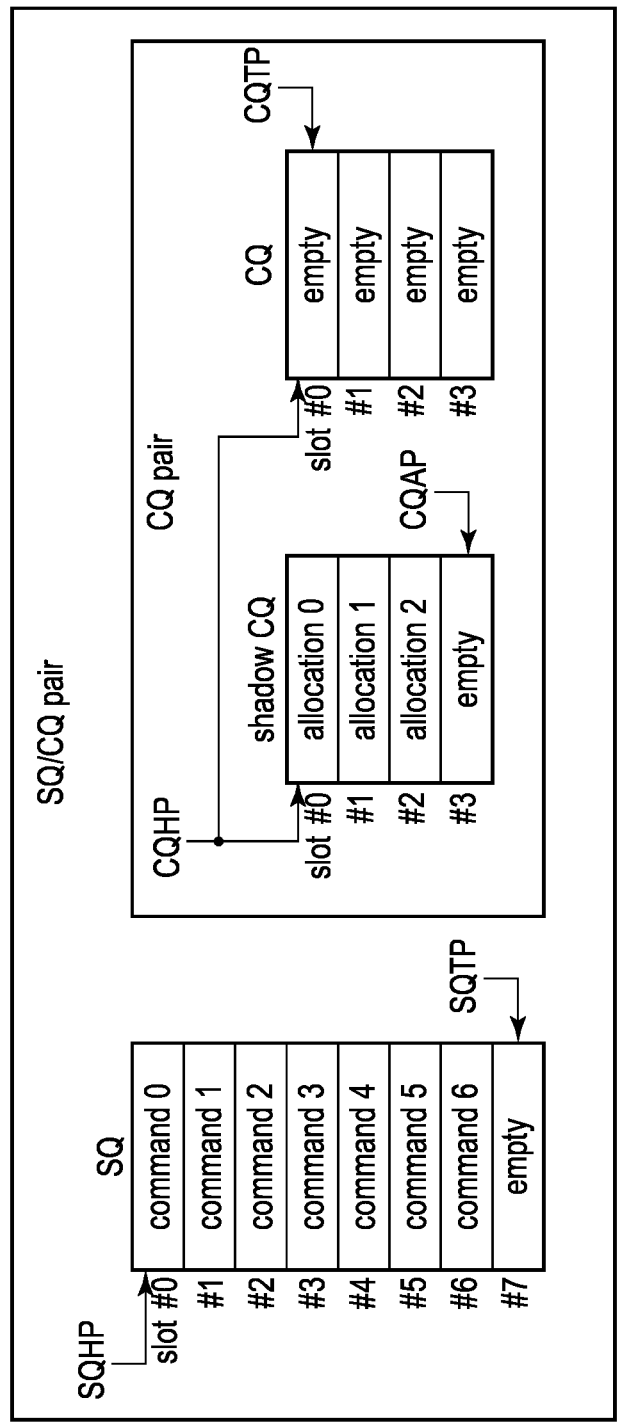
FIG. 9B is a diagram illustrating a second process of the command process executed in the memory system according to the embodiment.

FIG. 9B is a diagram illustrating a second process of the command process for the SQ/CQ pair.

The controller 4 updates the CQAP such that the value of the CQAP is incremented by the number of the commands to be actually fetched. When the number of the commands to be actually fetched is 3, that is, when fetching three commands (the command 0, the command 1, and the command 2) from the submission queue (SQ) is determined, the controller 4 increments the value of the CQAP by 3 such that three slots (the slots #0, #1, and #2) of the shadow completion queue are reserved for storing three command completions corresponding to the command 0, the command 1, and the command 2, respectively.

In FIG. 9B, "allocation 0" is indicative of a state in which one slot in the shadow completion queue is reserved for storing a command completion corresponding to the command 0. Similarly, "allocation 1" is indicative of a state in which one slot in the shadow completion queue is reserved for storing a command completion corresponding to the command 1. In addition, "allocation 2" is indicative of a state in which one slot in the shadow completion queue is reserved for storing a command completion corresponding to the command 2. In this manner, upon reserving the commands 0 to 2 to be fetched from the submission queue (SQ) before actually fetching the commands 0 to 2, the controller 4 decrements the number of free slots of the shadow completion queue by the same number (i.e., 3) of the reserved commands 0 to 2.

Three slots are reserved and the number of the empty slots included in the shadow completion queue thereby becomes one. That is, since the number of the free slots that can be newly reserved becomes zero, the shadow completion queue becomes full. Any one slot in the shadow completion queue is always maintained empty accordingly, similarly to the completion queue (CQ). When the shadow completion queue becomes full, that is, the number of the free slots of the shadow completion queue becomes zero, the controller 4 does not fetch additional commands (in this example, the commands 3 to 6) from the submission queue (SQ).

Figure 9C:
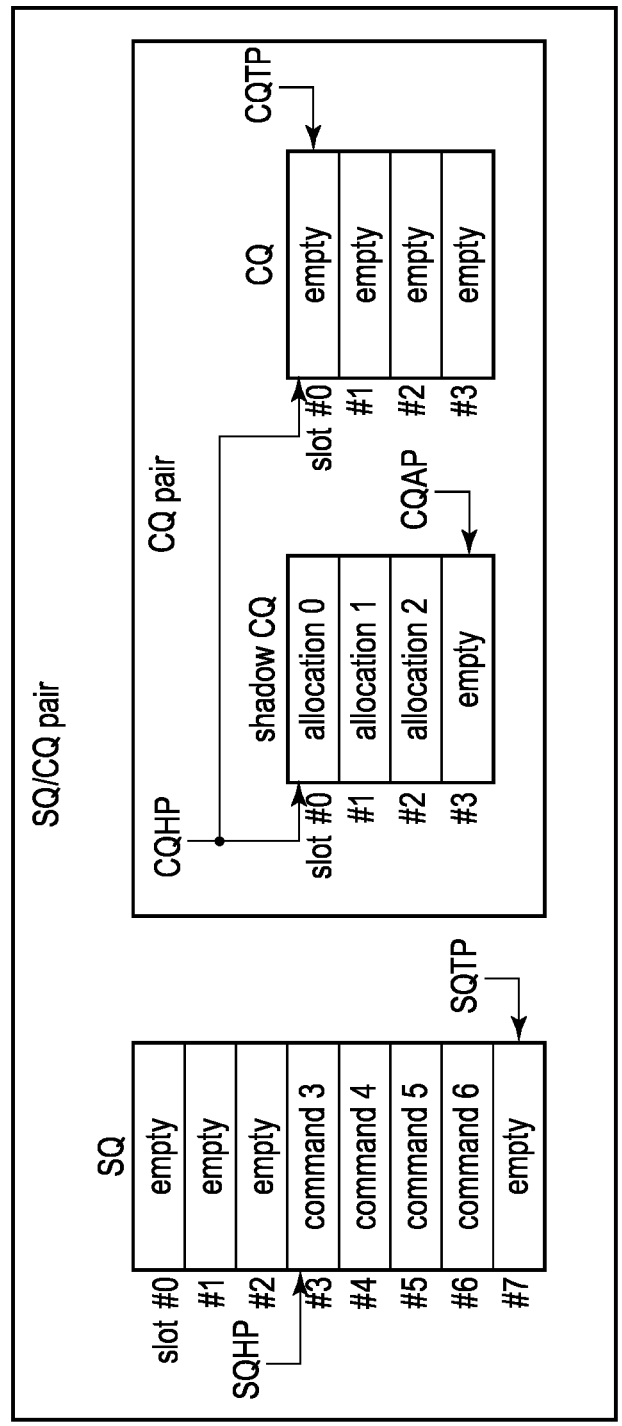
FIG. 9C is a diagram illustrating a third process of the command process executed in the memory system according to the embodiment.

FIG. 9C is a diagram illustrating a third process of the command process for the SQ/CQ pair. The controller 4 fetches three commands, that is, the commands 0 to 2 from the submission queue (SQ). The controller 4 updates the value of the submission queue head pointer (SQHP) from the value indicative of the slot #0 to the value indicative of the slot #3 in accordance with the number of the fetched commands.

FIG. 9D is a diagram illustrating a fourth process of the command process for the SQ/CQ pair. The controller 4 executes the commands 0 to 2 which have been fetched. When completing the execution of the commands 0 to 2, the controller 4 creates command completions 0 to 2 corresponding to the commands 0 to 2 which have been completed. The controller 4 places the command completions 0 to 2 into the completion queue (CQ).

The controller 4 updates the value of the completion queue tail pointer (CQTP) from the value indicative of the slot #0 to the value indicative of the slot #3 in accordance with the number of the command completions placed into the completion queue (CQ). As a result, the completion queue (CQ) and the shadow completion queue become the same state, that is, full.

Figure 9E:
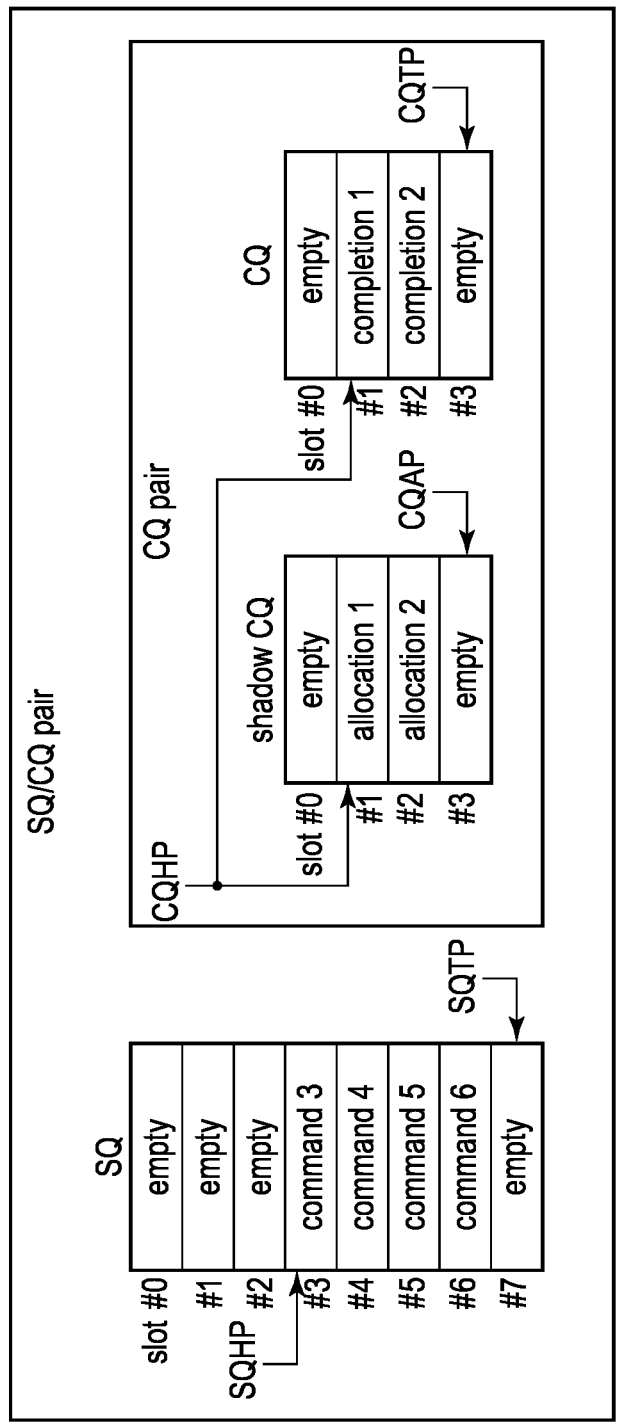
FIG. 9E is a diagram illustrating a fifth process of the command process executed in the memory system according to the embodiment.

FIG. 9E is a diagram illustrating a fifth process of the command process for the SQ/CQ pair. The host 2 processes the command completion 0 and updates the value of the completion queue head pointer (CQHP) from the value indicative of the slot #0 to the value indicative of the slot #1. When the completion queue head pointer (CQHP) is updated by the host 2, the controller 4 releases the slot #0 of the completion queue (CQ) and the slot #0 of the shadow completion queue, which have been indicated by the value of the CQHP before updated. The released slot #0 of the completion queue (CQ) and the released slot #0 of the shadow completion queue become empty.

The controller 4 calculates the number (here, 1) of the free slots of the shadow completion queue, based on the CQHP, the CQAP, and the size of the completion queue (CQ). Since the number of the free slots of the shadow completion queue becomes one from zero, the controller 4 can restart the process of fetching commands from the submission queue (SQ).

Figure 9F:
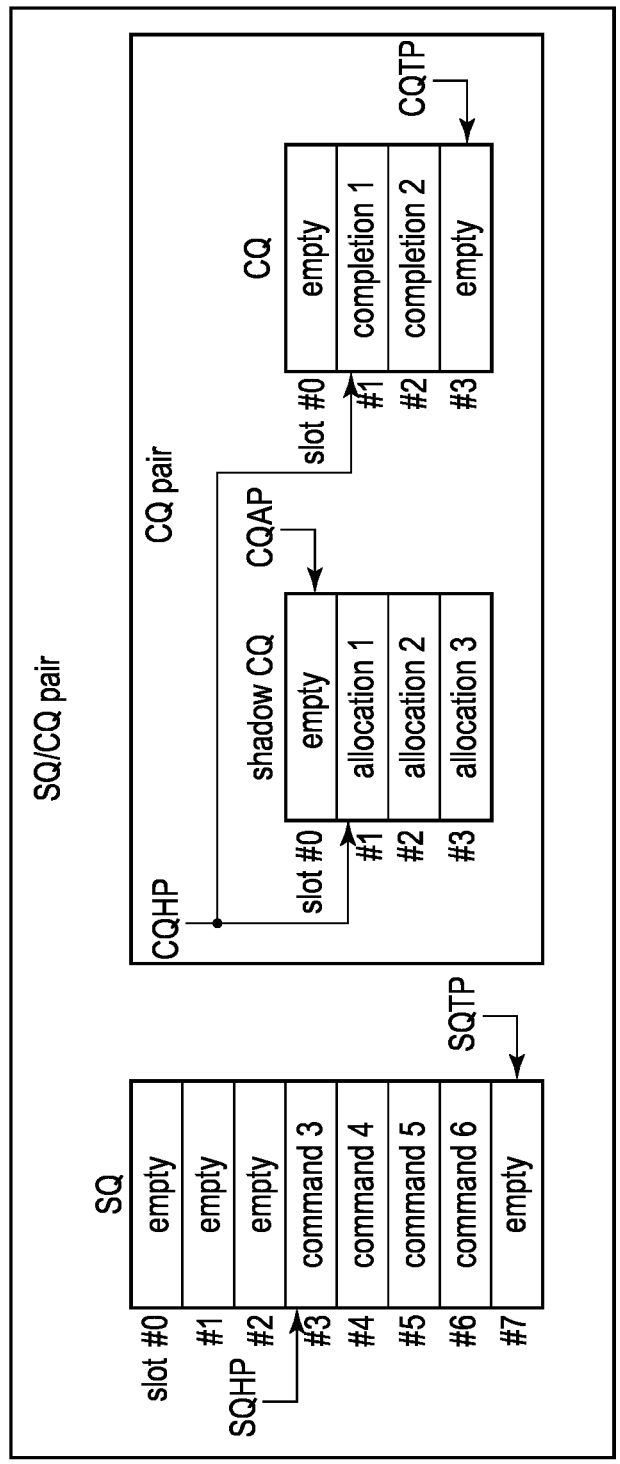
FIG. 9F is a diagram illustrating a sixth process of the command process executed in the memory system according to the embodiment.

FIG. 9F is a diagram illustrating a sixth process of the command process for the SQ/CQ pair.

The controller 4 increments the value of the CQAP by the number (=1) of the commands to be actually fetched. The value of the CQAP is thereby updated from the value indicative of the slot #3 to the value indicative of the slot #0. In FIG. 9F, "allocation 3" is indicative of a state in which one slot in the shadow completion queue is reserved for storing a command completion corresponding to the command 3.

Since the shadow completion queue becomes full again, that is, the number of the free slots of the shadow completion queue becomes zero, after updating the CQAP, the controller 4 does not fetch additional commands (the commands 4 to 6) from the submission queue (SQ).

Figure 9G:
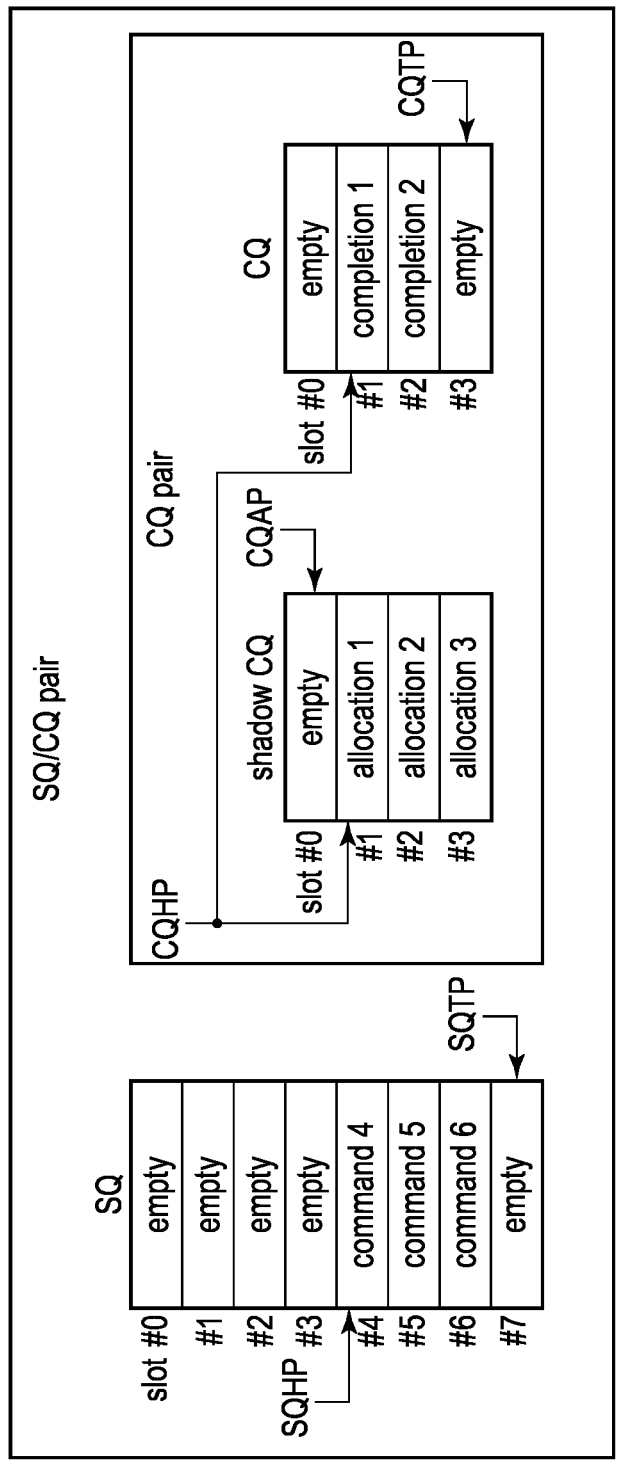
FIG. 9G is a diagram illustrating a seventh process of the command process executed in the memory system according to the embodiment.

FIG. 9G is a diagram illustrating a seventh process of the command process for the SQ/CQ pair. The controller 4 fetches the command 3 from the submission queue (SQ). The controller 4 updates the value of the submission queue head pointer (SQHP) from the value indicative of the slot #3 to the value indicative of the slot #4 in accordance with the number (in this example, 1) of the fetched commands.

Figure 9H:
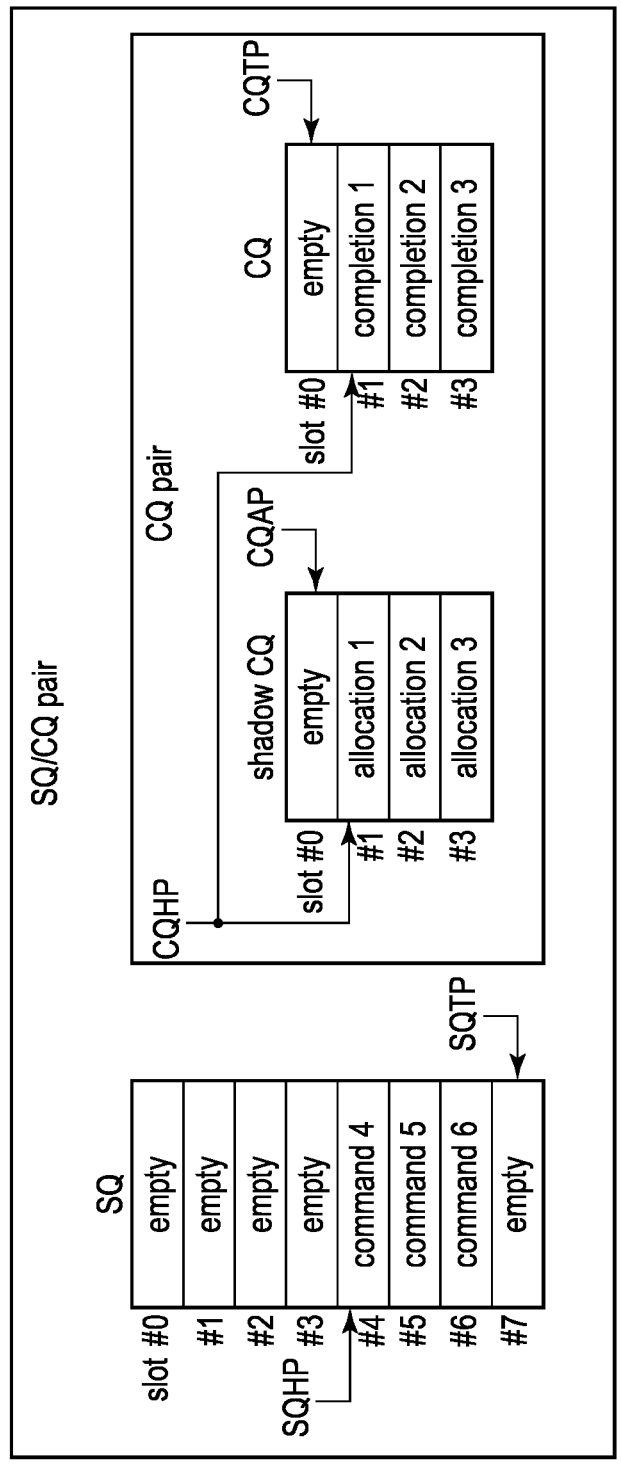
FIG. 9H is a diagram illustrating an eighth process of the command process executed in the memory system according to the embodiment.

FIG. 9H is a diagram illustrating an eighth process of the command process for the SQ/CQ pair. The controller 4 executes the fetched command 3. When completing the execution of the fetched command 3, the controller 4 creates a command completion 3 corresponding to the command 3. The controller 4 places the command completion 3 into the slot #3 of the completion queue (CQ).

The controller 4 updates the value of the completion queue tail pointer (CQTP) in accordance with the number (in this example, 1) of the command completions stored in the completion queue (CQ). The completion queue (CQ) and the shadow completion queue become the same state, that is, full.

As described, before fetching one or more commands from the submission queue (SQ), the number of the free CQ slots in the completion queue (CQ) that can store the command completions is calculated. Then, the maximum number of the commands which can be fetched from the submission queue (SQ) is limited up to the number of the free CQ slots.

Therefore, for example, when the number of free slots of the completion queue (CQ) is decreased due to delay in the host 2's processes for the command completions, the number of commands to be fetched from the submission queue (SQ) associated with the completion queue (CQ) is decreased automatically. Therefore, the number of commands fetched from the submission queue (SQ) can be adaptively controlled based on the progress degree of the processes of the command completions by the host 2.

Therefore, the command completion that cannot be placed into the completion queue (CQ) can be prevented from staying in the internal buffer 161. As a result, the command process for a particular SQ/CQ pair can be prevented from being stopped and, besides, it is also possible to prevent the command process for all the other SQ/CQ pairs from being stopped due to stop of the command process for the particular SQ/CQ pair.

Figure 10:
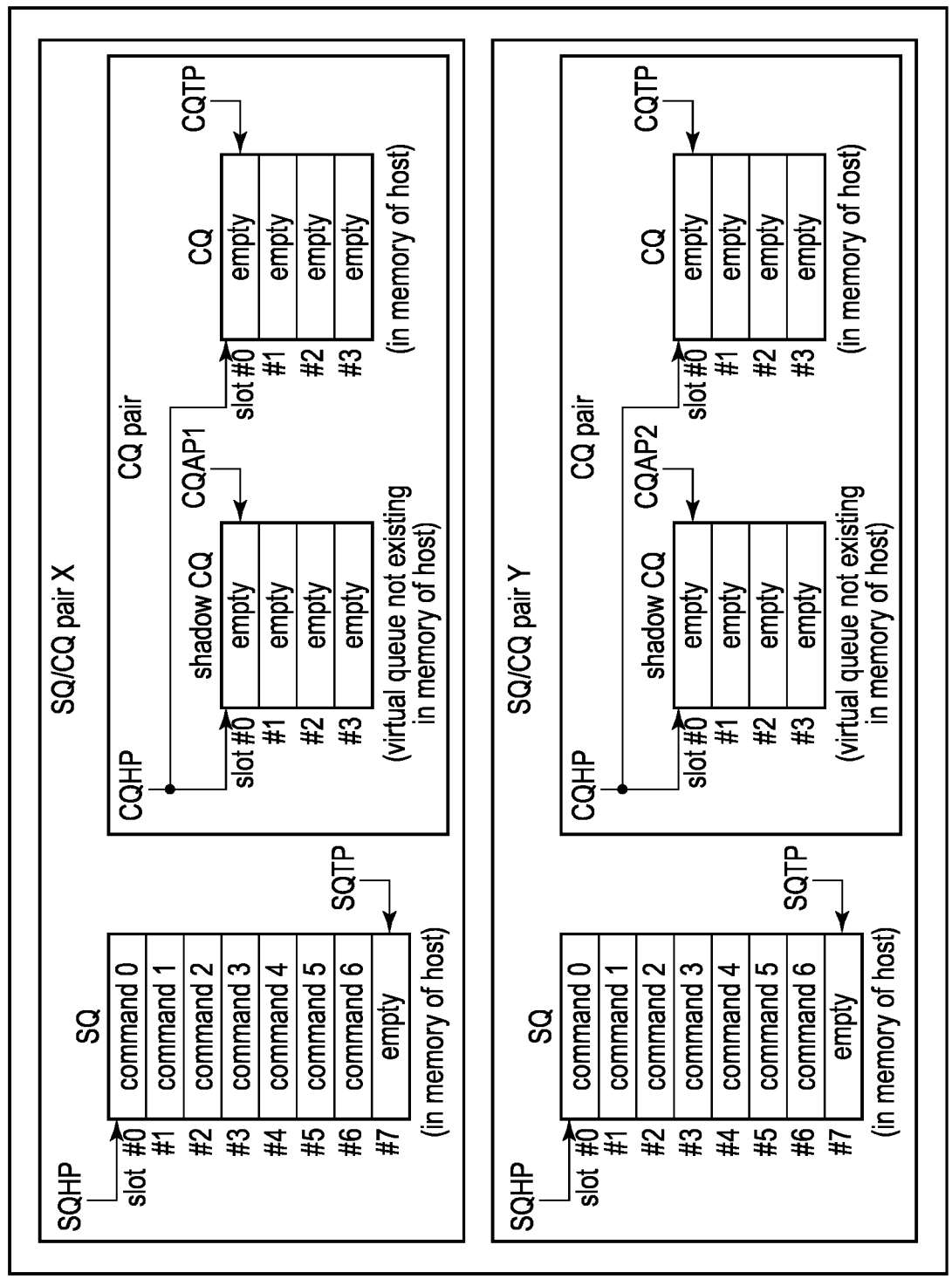
FIG. 10 is a diagram illustrating a command process for two SQ/CQ pairs, which is executed in the memory system according to the embodiment.

FIG. 10 is a diagram illustrating a command process for two SQ/CQ pairs executed in the SSD 3 according to the embodiment.

A case where two SQ/CQ pairs (i.e., SQ/CQ pair X and SQ/CQ pair Y) are allocated in the memory 102 of the host 2 will be described here. Each of the SQ/CQ pairs includes one submission queue (SQ) and the completion queue (CQ) associated with this submission queue (SQ). Furthermore, the shadow completion queue and the CQAP are managed for each SQ/CQ.

The command process described with reference to FIG. 9A to FIG. 9H is executed for each of the SQ/CQ pair X and the SQ/CQ pair Y.

That is, when fetching the commands from the submission queue (SQ) of the SQ/CQ pair X, the controller 4 determines the number of free slots of the shadow completion queue of the SQ/CQ pair X to be the number of free CQ slots of the completion queue (CQ) of the SQ/CQ pair X, based on the size of the completion queue (CQ) of the SQ/CQ pair X, CQAP1 corresponding to the SQ/CQ pair X, and the CQHP corresponding to the completion queue (CQ) of the SQ/CQ pair X. Then, the number of the commands which can be fetched from the submission queue (SQ) of the SQ/CQ pair X is limited up to the number of the free CQ slots at a maximum.

When fetching the commands from the submission queue (SQ) of the SQ/CQ pair Y, the controller 4 determines the number of free slots of the shadow completion queue of the SQ/CQ pair Y to be the number of free CQ slots of the completion queue (CQ) of the SQ/CQ pair Y, based on the size of the completion queue (CQ) of the SQ/CQ pair Y, CQAP2 corresponding to the SQ/CQ pair Y, and the CQHP corresponding to the completion queue (CQ) of the SQ/CQ pair Y. Then, the number of the commands which can be fetched from the submission queue (SQ) of the SQ/CQ pair Y is limited up to the number of the free CQ slots at a maximum.

FIG. 11 is a flowchart illustrating a procedure of the command process executed in the SSD 3.

The controller 4 determines a submission queue (SQ) from which a command is to be fetched by the arbitration mechanism (step S101).

The controller 4 calculates the number of free CQ slots of the completion queue (CQ) associated with the submission queue (SQ) determined in step S101, based on the size of this completion queue (CQ), current CQHP of this completion queue (CQ), and the current completion queue allocate pointer (CQAP) of this completion queue (CQ) (step S102). At this time, the current completion queue allocate pointer (CQAP) is indicative of a next free CQ slot in a case where a first number of command completions are placed into the completion queue (CQ). The first number is equal to the number of commands that have already been fetched from the submission queue (SQ) determined in the step S101 and whose corresponding command completion has not yet been placed into the completion queue (CQ).

The controller 4 determines whether or not the number of the free CQ slots calculated in step S102 is equal to 0 (step S103).

When the calculated number of the free CQ slots is equal to 0 (yes in step S103), the controller 4 temporarily prohibits the command fetch unit 22 from fetching the commands from the submission queue (SQ) (step S104).

When the calculated number of the free CQ slots is 1 or more (no in step S103), the controller 4 determines the number of the commands to be fetched from the submission queue (SQ) within the calculated number of the free CQ slots (step S105).

The controller 4 updates the CQAP such that a new value of the CQAP is indicative of a next free CQ slot in a case where the same number of command completions as the number of the commands to be fetched, which is determined in step S105, are placed into the completion queue (CQ) in the future (step S106).

The controller 4 fetches the commands whose number is determined in the step S105, from the submission queue (SQ) (step S107).

As described above, according to the embodiment, the upper limit of the number of commands which can be fetched from the submission queue (SQ) is limited to the calculated number of free CQ slots. Therefore, for example, when the number of the free CQ slots of a certain completion queue (CQ) is decreased due to delay in the host 2's processes for the command completions, the number of commands which are fetched from the submission queue (SQ) associated with this completion queue (CQ) is also decreased automatically. Therefore, the number of commands which are fetched from the submission queue (SQ) can be adaptively controlled based on the progress degree of the processes of the command completions stored in the completion queue (CQ) associated with this submission queue (SQ).

As a result, a plurality of command completions that cannot be placed into a certain completion queue (CQ) can be prevented from staying within the internal buffer 161. Therefore, it is possible to improve the reliability of the SSD 3 and the reliability of the entire information processing system 1.

In addition, it can be ensured that the calculated number of the free CQ slots is not less than the number of the actual free CQ slots available, by calculating the number of the free CQ slots by using the CQAP. As a result, executing in parallel the process of placing the command completions into the completion queue (CQ) and the process of fetching the commands from the submission queue (SQ) can be allowed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory; and
   a controller electrically connected to the nonvolatile memory and configured to control the nonvolatile memory and execute communication with a host in conformity with a standard of NVM express, wherein the controller is configured to:
      when fetching a command from a first submission queue, determine a number of commands to be fetched with a number of free slots among a plurality of slots included in a first completion queue as an upper limit, the first completion queue being associated with the first submission queue; and
      fetch the determined number of commands from the first submission queue.

2. The memory system of claim 1, wherein
   the number of the free slots among the plurality of slots included in the first completion queue is obtained based on (1) a first pointer indicative of a next free slot of the first completion queue in a case where a first number of command completions are placed into the first completion queue, the first number being equal to a number of commands that have already been fetched from the first submission queue and whose corresponding command completion has not yet been placed into the first completion queue, (2) a first completion queue head pointer indicative of a slot in the first completion queue in which a next command completion to be processed by the host is stored, and (3) a number of the plurality of slots included in the first completion queue.

3. The memory system of claim 2, wherein
   the number of the free slots among the plurality of slots included in the first completion queue is obtained by subtracting a difference between a value of the first pointer and a value of the first completion queue head pointer from a number smaller than the number of the plurality of slots included in the first completion queue by 1.

4. The memory system of claim 1, wherein
   the controller is configured to:
      calculate the number of the free slots among the plurality of slots included in the first completion queue, based on (1) a first pointer indicative of a next free slot of the first completion queue in a case where a first number of command completions are placed into the first completion queue, the first number being equal to a number of commands that have already been fetched from the first submission queue and whose corresponding command completion has not yet been placed into the first completion queue, (2) a first completion queue head pointer indicative of a slot in the first completion queue in which a next command completion to be processed by the host is stored, and (3) a number of the plurality of slots included in the first completion queue; and
      determine the number of commands to be fetched with the calculated number of the free slots as the upper limit.

5. The memory system of claim 4, wherein
   the controller is configured to:
      calculate the number of the free slots among the plurality of slots included in the first completion queue by subtracting a difference between a value of the first pointer and a value of the first completion queue head pointer from a number smaller than the number of the plurality of slots included in the first completion queue by 1.

6. The memory system of claim 4, wherein
   the controller is configured to:
      manage the first pointer by using a shadow completion queue which has a size equal to a size of the first completion queue and which is a virtual completion queue indicative of a future state of the first completion queue, the first pointer being indicative of a next free slot in the shadow completion queue;
      when fetching the determined number of commands, increment the first pointer by the determined number such that slots in the shadow completion queue whose number is equal to the determined number are reserved for storing command completions whose number is equal to the determined number;

when the first completion queue head pointer has been updated by the host, release a slot in the shadow completion queue, which is indicated by a value of the first completion queue head pointer before the update; and calculate a number of free slots in the shadow completion queue which is obtained based on the first pointer, the first completion queue head pointer, and a size of the shadow completion queue, as the number of the free slots among the plurality of slots included in the first completion queue.

7. The memory system of claim 1, wherein the controller is further configured to:

when fetching a command from a second submission queue different from the first submission queue, determine a number of commands to be fetched with a number of free slots among a plurality of slots included in a second completion queue as an upper limit, the second completion queue being associated with the second submission queue; and fetch the determined number of commands from the second submission queue.

8. The memory system of claim 7, wherein the number of the free slots among the plurality of slots included in the second completion queue is obtained based on (1) a second pointer indicative of a next free slot of the second completion queue in a case where a second number of command completions are placed into the second completion queue, the second number being equal to a number of commands that have already been fetched from the second submission queue and whose corresponding command completion has not yet been placed into the second completion queue, (2) a second completion queue head pointer indicative of a slot in the second completion queue in which a next command completion to be processed by the host is stored, and (3) a number of the plurality of slots included in the second completion queue.

9. The memory system of claim 8, wherein the number of the free slots of the plurality of slots included in the second completion queue is obtained by subtracting a difference between a value of the second pointer and a value of the second completion queue head pointer from a number smaller than the number of the plurality of slots included in the second completion queue by 1.

10. The memory system of claim 1, wherein the controller is configured to:

when a command is to be fetched from the first submission queue while one or more free slots exist in the first completion queue, fetch one or more commands from the first completion queue, a maximum number of the commands which are fetched being equal to the number of the free slots of the first completion queue; and when no free slot exists in the first completion queue, not fetch a command from the first submission queue.

11. A memory system connectable to a host, the host including a first submission queue and a first completion queue, the first completion queue being associated with the first submission queue, the first completion queue including a plurality of slots, the memory system comprising:

a nonvolatile memory; and a controller electrically connected to the nonvolatile memory and configured to:

determine a number of free slots among the plurality of slots of the first completion queue;

determine a maximum number of commands to be fetched from the first submission queue, the maximum number being less than or equal to the determined number of free slots of the first completion queue; and fetch one or more commands from the first submission queue, a number of the one or more commands being less than or equal to the determined maximum number.

12. The memory system of claim 11, wherein the controller is further configured to store a completion into one of the plurality of slots of the first completion queue, the completion being associated with a command having been fetched from the first submission queue.

13. The memory system of claim 12, wherein each of the free slots of the first completion queue is a slot that is available for storing the completion.

14. The memory system of claim 13, wherein the controller is configured to determine that the number of free slots of the first completion queue is decremented upon reserving the one or more commands to be fetched from the first submission queue.

15. The memory system of claim 11, wherein the controller is configured to manage the number of free slots of the first completion queue using a virtual queue by regarding the number of free slots of the first completion queue to be equal to a number of free slots of the virtual queue.

16. The memory system of claim 15, wherein the controller is configured to, upon reserving the one or more commands to be fetched from the first submission queue before actually fetching the one or more reserved commands from the first submission queue, decrement the number of free slots of the virtual queue by the same number of the one or more reserved commands.

17. The memory system of claim 16, wherein the controller is configured to, upon the host releasing one of the plurality of slots of the first completion queue in which a completion has been stored, increment the number of free slots of the first completion queue.

18. The memory system of claim 11, wherein the number of free slots of the first completion queue is less than the number of the plurality of slots of the first completion queue.

19. A method of controlling communication with a host in conformity with a standard of NVM express, the method comprising:

when fetching a command from a first submission queue, determining a number of commands to be fetched with a number of free slots among a plurality of slots included in a first completion queue as an upper limit, the first completion queue being associated with the first submission queue; and fetching the determined number of commands from the first submission queue.

20. The method of claim 19, wherein the number of the free slots among the plurality of slots included in the first completion queue is obtained based on (1) a first pointer indicative of a next free slot of the first completion queue in a case where a first number of command completions are placed into the first completion queue, the first number being equal to a number of commands that have already been fetched from the first submission queue and whose corresponding command completion has not yet been placed into the first completion queue, (2) a first completion queue head pointer indicative of a slot in the first completion queue in which a next command completion to be processed by the host is stored, and (3) a number of the plurality of slots included in the first completion queue.

* * * * *